United States Patent
Sung et al.

(10) Patent No.: US 10,456,004 B2
(45) Date of Patent: Oct. 29, 2019

(54) MOBILE ROBOT

(71) Applicant: LG ELECTRONICS INC., Seoul (KR)

(72) Inventors: Chulmo Sung, Seoul (KR); Woochan Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 15/597,333

(22) Filed: May 17, 2017

(65) Prior Publication Data
US 2017/0332871 A1 Nov. 23, 2017

(30) Foreign Application Priority Data

May 17, 2016 (KR) .................. 10-2016-0060444
Oct. 27, 2016 (KR) .................. 10-2016-0141106

(51) Int. Cl.
*A47L 11/40* (2006.01)
*A47L 11/33* (2006.01)
(Continued)

(52) U.S. Cl.
CPC ............ *A47L 11/4061* (2013.01); *A47L 5/22* (2013.01); *A47L 9/2826* (2013.01);
(Continued)

(58) Field of Classification Search
CPC ............ A47L 2201/00; A47L 2201/04; A47L 2201/06; A47L 2201/22; A47L 11/00;
(Continued)

(56) References Cited

U.S. PATENT DOCUMENTS

| 4,954,962 | A | 9/1990 | Evans, Jr. et al. |
| 6,496,754 | B2 | 12/2002 | Song et al. |

(Continued)

FOREIGN PATENT DOCUMENTS

| CN | 103941735 | 7/2014 |
| CN | 203943625 | 11/2014 |

(Continued)

OTHER PUBLICATIONS

KR-20150065972-A translation, Espacenet website (Year: 2018).*

(Continued)

*Primary Examiner* — Joseph J Hail
*Assistant Examiner* — Timothy Brian Brady
(74) *Attorney, Agent, or Firm* — Ked & Associates, LLP

(57) ABSTRACT

A robot cleaner of the present disclosure comprises a main body configured to travel in a cleaning zone and to suction a foreign substance on a floor in the cleaning zone, an image sensor provided on the main body and configured to obtain an image of a predetermined area at a front side of the main body, a first light source provided on the main body and configured to emit a first pattern of light to a first sub-area of the predetermined area and a second light source provided on the main body at a position below the first light source and configured to emit a second pattern of light to a second sub-area of the predetermined area, the first sub-area being located lower than the second sub-area.

18 Claims, 15 Drawing Sheets

(51) Int. Cl.

| | |
|---|---|
| *A47L 5/22* | (2006.01) |
| *A47L 9/28* | (2006.01) |
| *A47L 9/30* | (2006.01) |
| *B25J 5/00* | (2006.01) |
| *G01C 21/20* | (2006.01) |
| *G05D 1/02* | (2006.01) |
| *G01S 17/46* | (2006.01) |
| *G01S 17/93* | (2006.01) |
| *A47L 9/00* | (2006.01) |
| *A47L 11/00* | (2006.01) |

(52) U.S. Cl.
CPC .......... *A47L 9/2852* (2013.01); *A47L 9/2873* (2013.01); *A47L 9/2884* (2013.01); *A47L 9/30* (2013.01); *A47L 11/33* (2013.01); *A47L 11/4066* (2013.01); *A47L 11/4069* (2013.01); *B25J 5/007* (2013.01); *G01C 21/206* (2013.01); *G01S 17/46* (2013.01); *G01S 17/936* (2013.01); *G05D 1/024* (2013.01); *G05D 1/0231* (2013.01); *G05D 1/0246* (2013.01); *G05D 1/0248* (2013.01); *G05D 1/0274* (2013.01); *A47L 9/00* (2013.01); *A47L 11/00* (2013.01); *A47L 2201/022* (2013.01); *A47L 2201/04* (2013.01); *A47L 2201/06* (2013.01); *G05D 2201/0215* (2013.01); *Y10S 901/01* (2013.01)

(58) Field of Classification Search
CPC .. A47L 11/33; A47L 11/4061; A47L 11/4066; A47L 11/4069; A47L 9/00; A47L 9/2826; A47L 9/2852; A47L 9/2873; A47L 9/2884; A47L 9/30; B25J 5/007; G01C 21/206; G05D 1/0231; G05D 1/024; G05D 1/0246; G05D 2201/0215; Y10S 901/01
USPC .......... 701/23, 28, 301, 41, 45, 49; 700/255, 700/258, 259
See application file for complete search history.

(56) References Cited

U.S. PATENT DOCUMENTS

| | | | |
|---|---|---|---|
| 8,693,007 | B2 | 4/2014 | Ishigaki |
| 8,781,626 | B2 | 7/2014 | Landry et al. |
| 8,862,271 | B2 | 10/2014 | Shamlian et al. |
| 9,339,163 | B2 | 5/2016 | Noh et al. |
| 9,440,355 | B2 | 9/2016 | Noh et al. |
| 9,511,494 | B2 | 12/2016 | Noh et al. |
| 9,981,593 | B2 | 5/2018 | Mayer |
| 2005/0000543 | A1 | 1/2005 | Taylor et al. |
| 2010/0110280 | A1 | 5/2010 | Aoyama |
| 2010/0257690 | A1 | 10/2010 | Jones et al. |
| 2011/0144805 | A1 | 6/2011 | Chiappetta et al. |
| 2011/0245972 | A1 | 10/2011 | Yan |
| 2014/0209122 | A1* | 7/2014 | Jung ............... A47L 11/4002 134/18 |
| 2014/0304937 | A1* | 10/2014 | Kim ............... A47L 9/28 15/319 |
| 2015/0120056 | A1* | 4/2015 | Noh ............... G05D 1/024 700/259 |
| 2015/0168954 | A1* | 6/2015 | Hickerson ............ G01S 17/026 700/259 |
| 2015/0363914 | A1 | 12/2015 | Boyle et al. |
| 2016/0104044 | A1 | 4/2016 | Noh et al. |
| 2016/0279808 | A1 | 9/2016 | Doughty et al. |
| 2017/0072558 | A1 | 3/2017 | Reynolds et al. |
| 2017/0154219 | A1* | 6/2017 | Shin ............... G06T 7/74 |

FOREIGN PATENT DOCUMENTS

| | | |
|---|---|---|
| CN | 104245244 | 12/2014 |
| CN | 104586322 | 5/2015 |
| CN | 104597902 | 5/2015 |
| CN | 205031182 | 2/2016 |
| JP | 2013-104858 | 5/2013 |
| JP | 2014-048842 | 3/2014 |
| KR | 10-2013-0141979 | 12/2013 |
| KR | 10-1362373 | 2/2014 |
| KR | 10-2015-0050160 | 5/2015 |
| KR | 10-2015-0065972 | 6/2015 |
| KR | 20150065972 A * | 6/2015 |
| KR | 10-2016-0043841 | 4/2016 |

OTHER PUBLICATIONS

PCT International Search Report (with English Translation) dated Sep. 4, 2017 issued in Application No. PCT/KR2017/005136.
Taiwanese Office Action dated Feb. 5, 2018 issued in Application No. 106116151.
PCT International Search Report (with English Translation) dated Feb. 26, 2018 issued in Application No. PCT/KR2017/005132.
Taiwanese Office Action dated Mar. 14, 2018 issued in Application No. 106116158.
U.S. Office Action issued in a co-pending related U.S. Appl. No. 15/597,531 dated Oct. 5, 2018.
PCT International Search Report (with English Translation) dated Feb. 20, 2018 issued in Application No. PCT/KR2017/005133.
PCT International Search Report (with English Translation) dated Feb. 26, 2018 issued in Application No. PCT/KR2017/005135.
Taiwanese Office Action dated Feb. 26, 2018 issued in Application No. 106116156.
Korean Office Action dated Mar. 20, 2018 issued in Application No. 10-2016-0141106.
Taiwanese Office Action dated Mar. 29, 2018 issued in Application No. 106116154.
U.S. Office Action dated Feb. 26, 2019 issued in U.S. Appl. No. 15/597,418.
U.S. Office Action dated Jun. 27, 2019 issued in U.S. Appl. No. 15/597,670.

* cited by examiner

Fig. 14
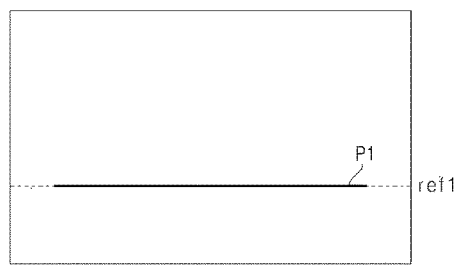
(a)
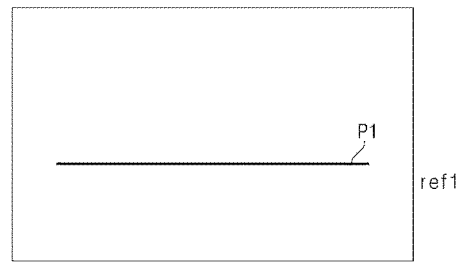
(b)
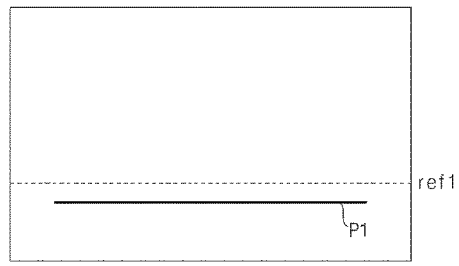
(c)
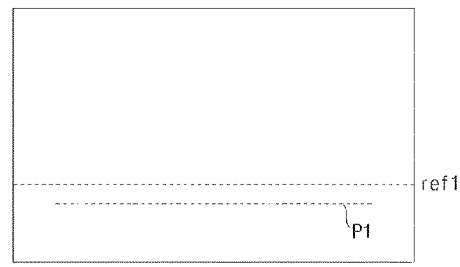
(d)
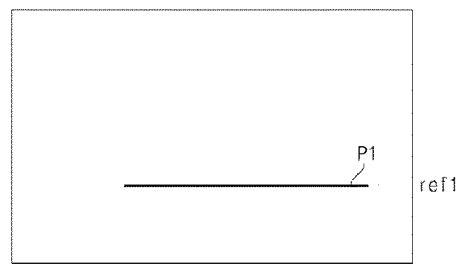
(e)

MOBILE ROBOT

CROSS-REFERENCE TO RELATED APPLICATION(S)

This application claims the priority benefit of Korean Patent Applications No. 10-2016-0060444, filed in Korea on May 17, 2016 and No. 10-2016-0141106, filed on Oct. 27, 2016 in the Korean Intellectual Property Office, the disclosures of which are incorporated herein by reference.

BACKGROUND

1. Field

The present disclosure relates to a robot cleaner.

2. Background

A robot cleaner is an apparatus that automatically cleans a floor by suctioning foreign substances, such as dust, while traveling autonomously within a zone to be cleaned. The robot cleaner may sense distances to detected obstacles in the cleaning zone, such as furniture, office equipment, or walls, and the robot cleaner may, correspondingly, map the obstacles within the cleaning zone and maneuver to avoid the obstacles by controlling an application of a driving force to one or more wheels included in the robot cleaner.

The distance traveled by the robot cleaner from a given location has been measured using a sensor that observes movements of the robot cleaner relative to a nearby ceiling or floor. A location of a detected obstacle (i.e., the distance of the obstacle from a given location) has been calculated based on the measured distance traveled by the robot cleaner from the given location before encountering the obstacle. However, this measurement of the distance to the obstacle is an indirect estimate based on the travel distance of the robot cleaner, and inaccuracies in measuring the travel distance of the robot cleaner results in errors in determining the location of the obstacles. Errors in determining the travel distance may arise due to, for example, indentations in the floor. In another example, a robot cleaner may perform distance measurements by emitting infrared light or ultrasonic waves and measuring reflections from obstacles, and these types of measurement techniques may cause a considerable error due to the large amount of light or sound being scattered by obstacles.

Korean Patent Laid-Open Publication No. 10-2013-0141979 (hereinafter referred to as "'979 disclosure") discloses a robot cleaner that includes a light source module configured to emit light in a cross-shaped pattern and a camera module configured to capture an image in front of the cleaner. The robot cleaner extracts the pattern from the image obtained via the camera module, and recognizes obstacles in the cleaning zone based on the extracted pattern. However, the range within which obstacles may be sensed by this robot cleaner is limited, and the robot cleaner cannot recognize a three-dimensional shape of an obstacle that vertically extends above a certain height.

For example, the robot cleaner in the '979 disclosure may not sense an obstacle that is located higher than the light source module or an obstacle that is higher from the floor than the light source module due to the nature of the cross-shaped pattern of light being emitted toward the floor in the cleaning zone. In the '979 disclosure, the height of an obstacle may be measured, to some extent, by using a vertical line pattern of light emitted from the camera module to radiate a portion of the obstacle. However, this technique enables the robot cleaner to collect information only about the portion of the obstacle that is irradiated with the vertical line pattern of light.

For example, when an obstacle such as a bed having a mattress placed on bed legs with a predetermined space is defined below the mattress, a control unit of the robot cleaner may fail to identify the mattress because the cross-shaped pattern of light emitted from the light source module is directed to the floor in the space and would not radiate the mattress. Since no obstacle would be detected, the control unit would control the robot cleaner to continue to travel toward the bed, where robot cleaner may collide with a structure, such as a frame that supports the mattress, and be prevented from entering the space, or may become jammed within this space between the floor and the frame.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 14 shows views illustrating patterns of light emitted by a first pattern irradiator of the obstacle-sensing unit of FIG. 12.

DETAILED DESCRIPTION

Figure 1:
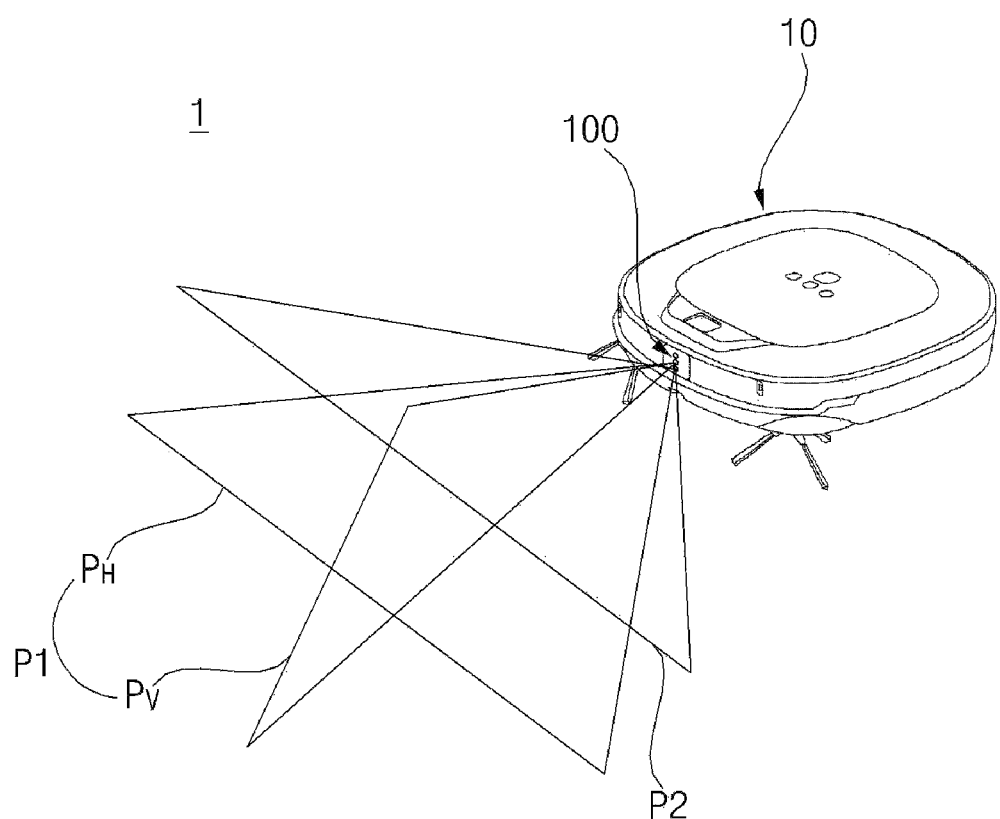
FIG. 1 is a perspective view of a robot cleaner according to an embodiment of the present disclosure.

Referring to FIGS. 1 to 7, the robot cleaner 1 according to an embodiment of the present disclosure may include a main body 10, which travels on a floor in a cleaning zone and suctions foreign substances (e.g., dust on) the floor, and an obstacle-sensing unit (obstacle sensor) 100 provided on the front surface of the main body 10. A casing 11 forms an external appearance of the main body 10 and internally defines a space in which constituent elements of the main body 10 are accommodated. A suction unit or module with a cleaning roller or cleaning brush 34 may provided in the casing 11 to collect foreign substances, such as dust or waste. A left wheel 36L and a right wheel 36R may be rotatably provided on the casing 11. The main body 10 travels on the floor in the cleaning zone via rotations of the left wheel 36L and the right wheel 36R, and in this process, foreign substances are suctioned into the main body 10 via the cleaning roller 34.

The suction unit may include a suction fan (not illustrated), which generates suction force, and a suction port 10*h* through which an air stream generated by the rotation of the suction fan is suctioned. The suction unit may further include a filter (not illustrated), which collects foreign substances from the air stream suctioned through the suction port 10*h*, and a foreign substance collection container (not illustrated) in which the foreign substances collected by the filter accumulate.

In addition, the main body 10 may include a travel driving device (drive module) 300, which drives the left wheel 36L and the right wheel 36R. The travel driving device 300 may include at least one drive motor. For example, the drive device 300 may include a left-wheel drive motor configured to rotate the left wheel 36L, and a right-wheel drive motor configured to rotate the right wheel 36R.

A controller 200 may include a travel controller 230, which controls the travel driving device 300. The travel controller 230 may cause the main body to travel forward, travel backward, or rotate by separately controlling the operation of the left-wheel drive motor and the right-wheel drive motor. For example, the left-wheel drive motor and the right-wheel drive motor may be rotated in a same direction to cause the main body 20 to travel forward, and the travel direction of the main body 10 may be changed when the travel controller 230 instructs the left-wheel drive motor and the right-wheel drive motor to rotate at different speeds or to rotate in opposite directions. At least one auxiliary wheel 37 may be further provided on the main body 10 in order to stably support the main body 10.

A data storage 240 stores obtained images captured by the obstacle-sensing unit 100, reference data acquired by an obstacle information obtainer 220 to determine obstacles, and obstacle information regarding the sensed obstacles. In addition, the data storage 240 may store control data used to control the operation of the robot cleaner 1, data regarding different cleaning modes of the robot cleaner 1, and maps that are produced in the robot cleaner 1 or received from the outside. Data stored by the data storage 240 may be microprocessor-readable. The data storage 240 may include a hard disc drive (HDD), solid state disc (SSD), silicon disc drive (SDD), ROM, RAM, CD-ROM, magnetic tape, floppy disc, or optical data storage device.

A cleaning device (or cleaning controller) 310 operates brushes 35 so as to allow dust or foreign substances around the robot cleaner 1 to be easily suctioned, and controls the cleaning roller or cleaning brush 34 in the suction unit to suction dust or foreign substances. The cleaning device 310 may also control the operation of the suction fan provided in the suction unit, which suctions foreign substances such as dust or waste, thereby causing the dust to be introduced into the foreign substance collection container through the suction port 10*h*. Brushes 35 may be provided on the front side of the lower surface portion of the casing 11 and may each include radially extending blades or bristles. Dust is removed from the floor in the cleaning zone through a rotation of the brushes 35, and in turn, the dust removed from the floor is suctioned through the suction port 10*h* to thereby be collected in the collection container.

A control panel 39 may be provided on the upper surface of the casing 11 so as to receive various commands for controlling the robot cleaner 1 from a user. A rechargeable battery 38 is provided in the main body 10. The charging of the battery 38 may be accomplished when a charging terminal 33 of the battery 38 is connected to a commercial power source (e.g. a power plug in the house) or when the main body 10 is docked with a separate charging station (not illustrated) that is connected to the commercial power source so that the charging terminal 33 is electrically connected to the commercial power source. Electrical constituent elements of the robot cleaner 1 may receive power from the battery 38, and thus, the robot cleaner 1 may perform autonomous traveling when the battery 38 is charged, even if the robot cleaner 1 is electrically separated from the commercial power source.

Figure 6:
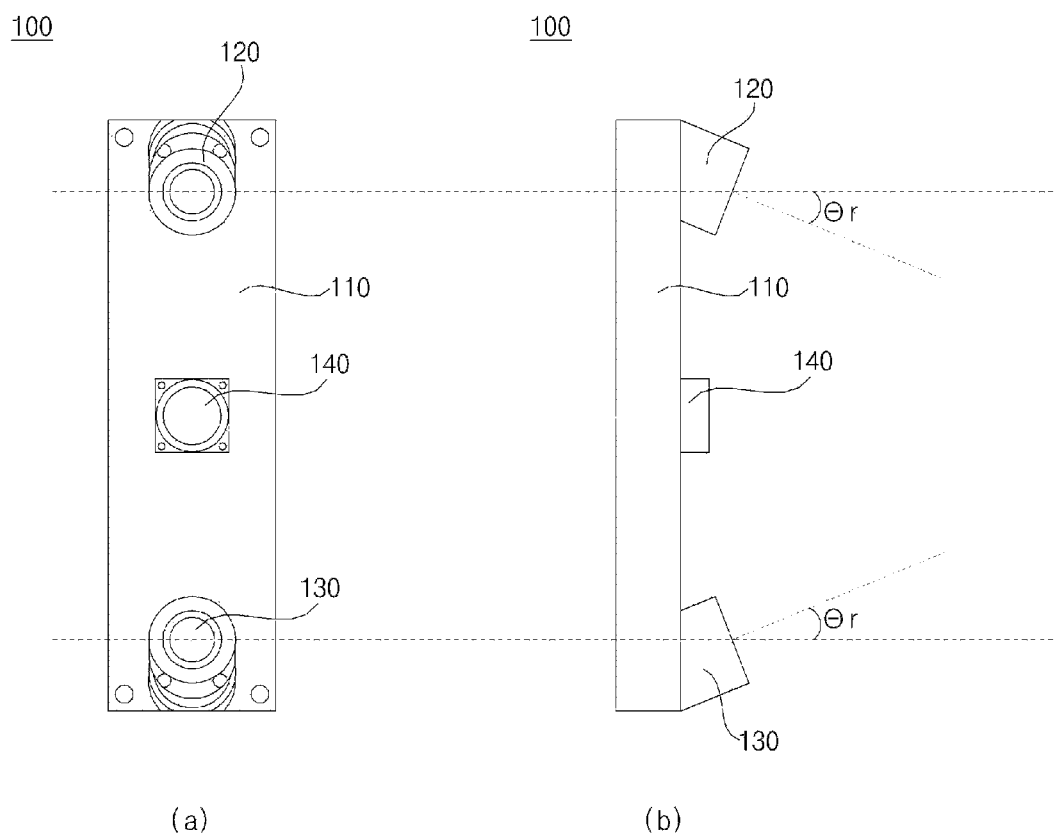
FIG. 6 shows a front view and a side view of an obstacle-sensing unit.

The obstacle-sensing unit 100 may be provided on the front surface of the main body 10. As shown in FIG. 6, the obstacle-sensing unit 100 may include a first pattern irradiator (or light source) 120, a second pattern irradiator (or light source) 130, and an image obtainer (or camera or sensor) 140. The image obtainer 140 captures an image of a predetermined area in front of the main body 10. The first pattern irradiator 120 downwardly emits a first pattern of light to the area. The second pattern irradiator 130 is provided below the first pattern irradiator 120 and upwardly emits a second pattern of light to the area. In other examples, one or more components of the obstacle-sensing unit 100 may be provided on a different surface of the main body 10, such as on a top, side, or bottom surface. Additionally, it should be appreciated that although the first pattern irradiator 120 and the second pattern irradiator 130 are described herein as separate components, they may be included in a single unit (not shown) that transmits both the first and second patterns of light. For example, a single pattern irradiator 120 may include a lens, splitter, mirror, or other element that divides an output to form the first and second patterns of light. In yet another example, a single pattern irradiator 120 may alternatively output the first and second patterns of light.

More specifically, referring to FIG. 6, the obstacle-sensing unit 100 may include a module frame 110, which may be fixed to the front surface of the casing 11 and is vertically elongated. The first pattern irradiator 120, the second pattern irradiator 130, and the image obtainer 140 may be fixed to the module frame 110. In some embodiments, the first pattern irradiator 120, the second pattern irradiator 130, and/or the image obtainer 140 may be directly fixed to the casing 11 without the module frame 110.

In one example, the first pattern irradiator 120, the second pattern irradiator 130, and/or the image obtainer 140 image sensor may be mounted on a substrate. The substrate may be coupled to the front surface of the casing 11. The substrate may be a printed circuit board (PCB) or flexible PCB wiring.

Each of the pattern irradiators 120 and 130 may include a light source and an optical pattern projection element (OPPE), which produces a predetermined optical pattern when penetrated by light emitted from the light source. The light source may be, for example, a laser diode (LD) or a light-emitting diode (LED). The light source may include a laser that enables precise distance measurement because the laser typically has superior monochromaticity, straightness, and connection characteristics compared to other light sources. In contrast, an infrared light or a visible right may have a large variation in the distance measurement accuracy depending on factors, such as a color, surface conditions, and a material of an object reciving the infrared or visible light. The OPPE may include a lens and a diffractive optical element (DOE). As described below, various patterns of light may be emitted depending on the configuration of the optical pattern projection element included in each of the pattern irradiators 120 and 130.

The first pattern irradiator 120 may emit a first pattern of light P1 (hereinafter referred to as "first patterned light") to the front lower side of the main body 10. Thus, the first patterned light P1 may be emitted toward the floor in the cleaning zone. The first patterned light P1 may have a cross-shaped pattern that includes a horizontal line Ph and a vertical line Pv that intersect. For example, the vertical line Pv may cross the horizontal line Ph at its midpoint.

The first pattern irradiator 120, the image obtainer 140, and the second pattern irradiator 130 may be linearly aligned. In the example depicted in FIG. 6, the image obtainer 140 may be located between the first pattern irradiator 120 and the second pattern irradiator 130, but it should be appreciated that the image obtainer 140 may be moved related to the first pattern irradiator 120 and the second pattern irradiator 130. In one embodiment, the first pattern irradiator 120 may be located above the image obtainer 140 and may emit the first patterned light P1 forward and downward relative to the main body 10. Thus, the first pattern irradiator 120 may radiate the first patterned light P1 on an obstacle that is located lower than the first pattern irradiator 120. The second pattern irradiator 130 may be located below the image obtainer 140 and may emit a second pattern of light P2 (hereinafter referred to as "second patterned light) forward and upward relative to the main body 10. Thus, the second patterned light P2 may be radiated on a portion of a wall or other obstacle, and this radiated portion may be that is located at a height which is higher than at least the second pattern irradiator 130.

Figure 9:
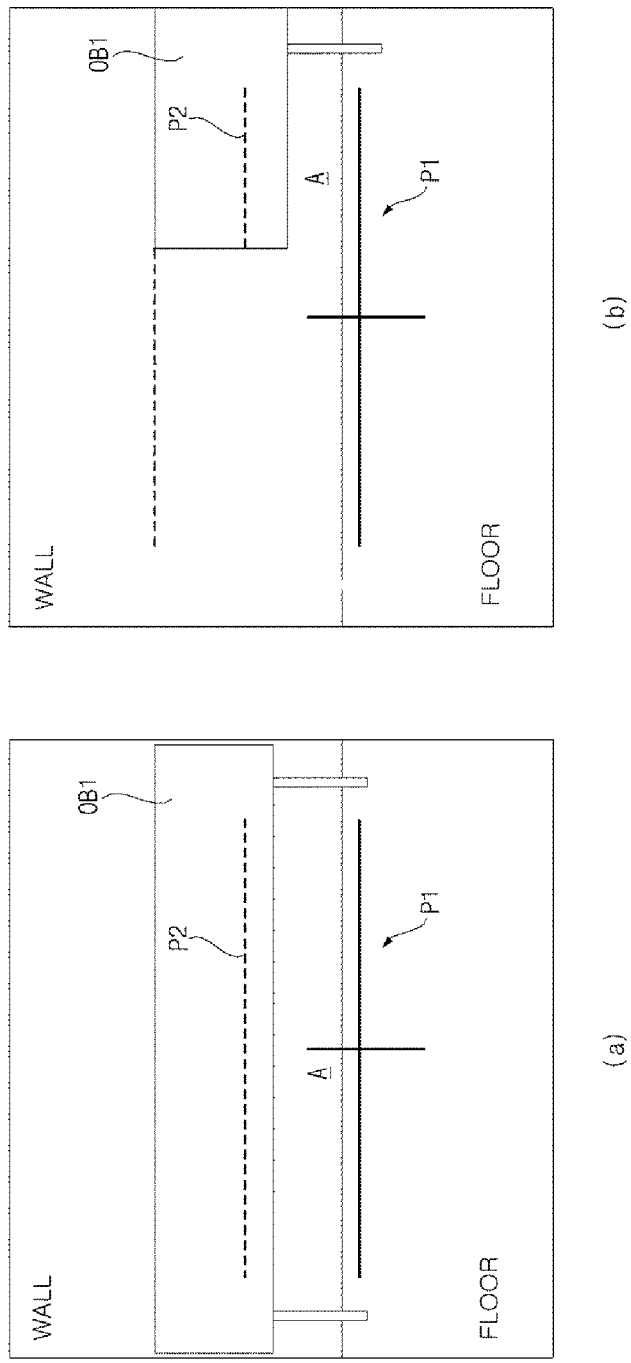
FIG. 9 shows views respectively illustrating an image obtained when the robot cleaner is at a first position and an obstacle is located in front of the robot cleaner and an image obtained when the position of the robot cleaner is changed to a second position.
Figure 10:
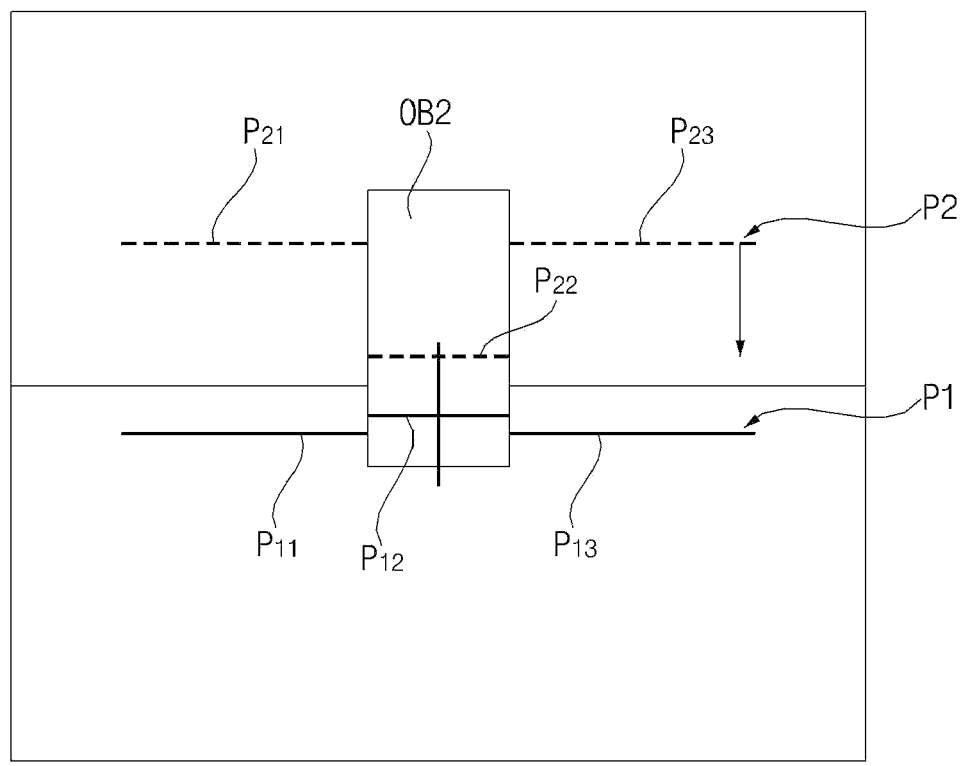
FIG. 10 is a view illustrating an image obtained when the first patterned light and the second patterned light are radiated on an obstacle.
Figure 15:
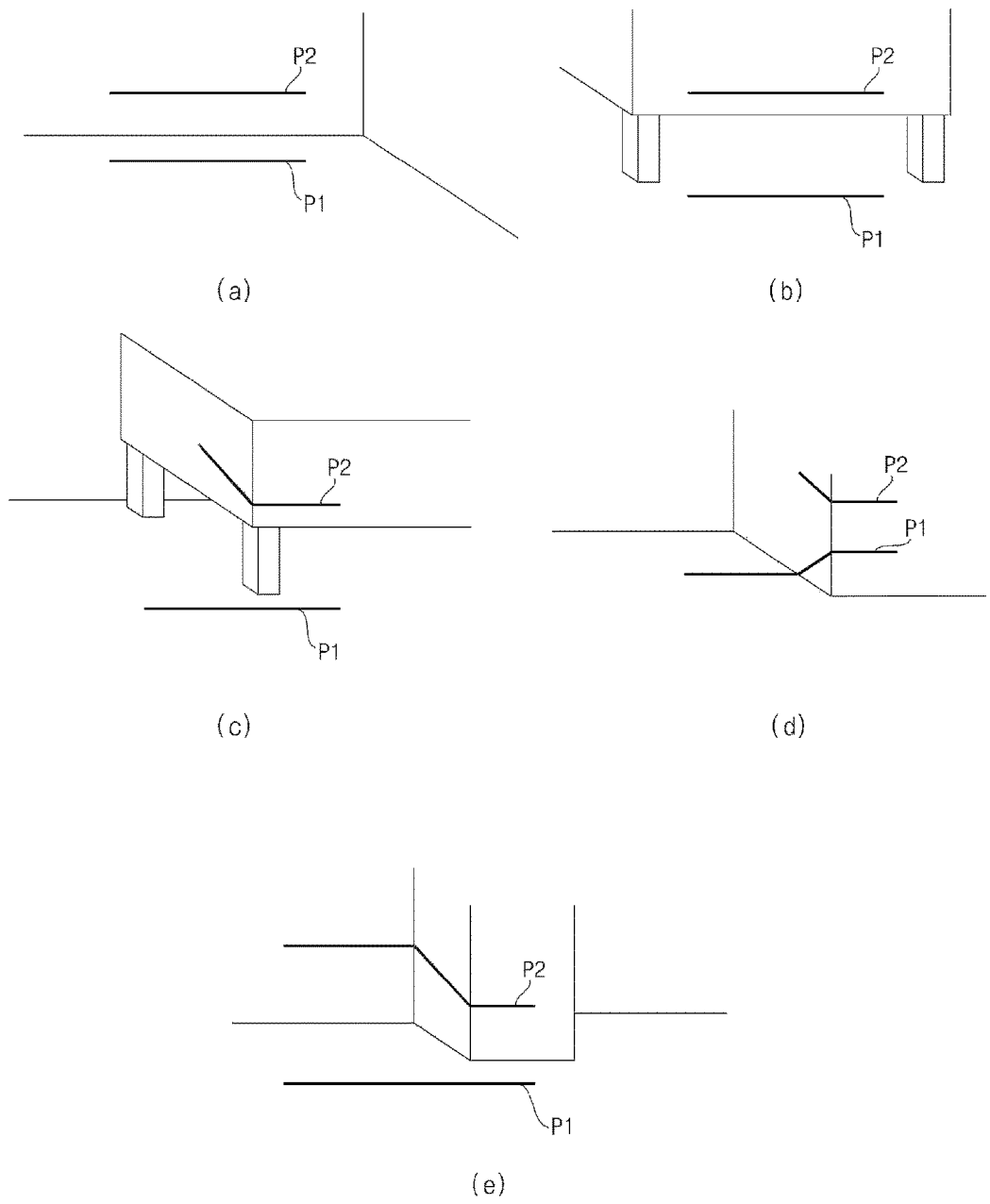
FIG. 15 shows views illustrating patterns of light emitted to an obstacle in the robot cleaners according to the embodiments of the present disclosure.

The second patterned light P2 may have a different pattern from that of the first patterned light P1 and may include, for example, a horizontal line segment. As shown in FIG. 15, the horizontal line segment in the first patterned light P1 may be a continuous line. In another example, the horizontal line segment in the first patterned light P1 may be a dotted, dashed, or other intermittent line, as illustrated in FIGS. 9 and 10. Thus, the horizontal line segment in the first patterned light P1 and the second patterned light P2 may be visually distinguished based on whether a detected reflection is associated with a continuous or intermittent pattern section.

Figure 2:
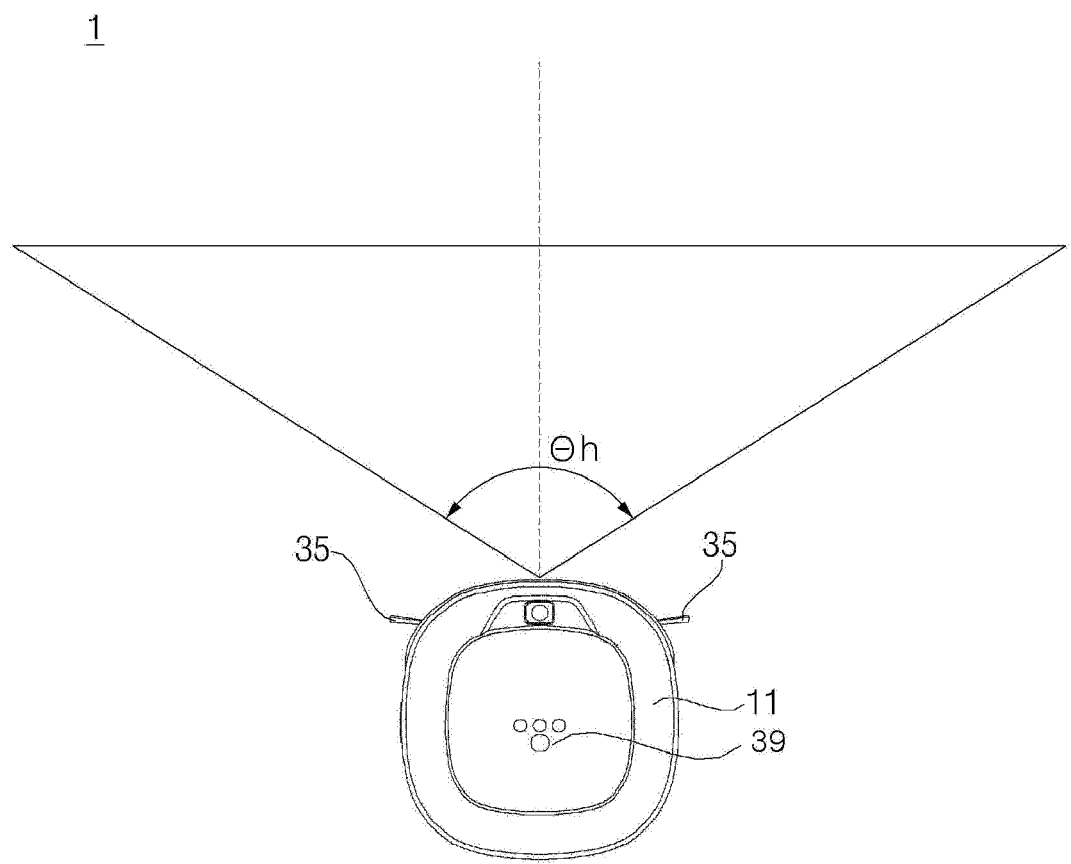
FIG. 2 is a view illustrating the horizontal view angle of the robot cleaner of FIG. 1.
Figure 3:
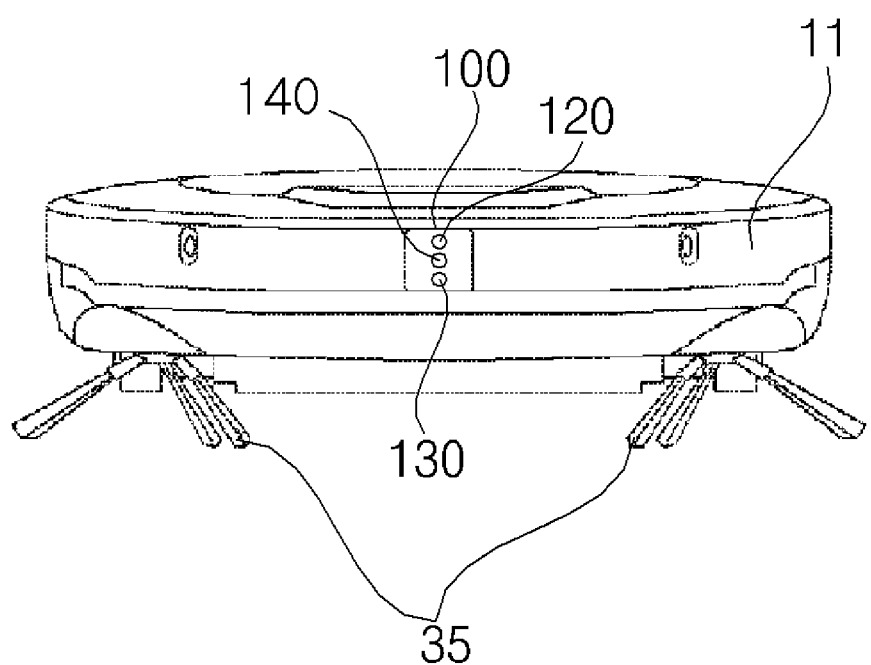
FIG. 3 is a front view of the robot cleaner of FIG. 1.
Figure 4:
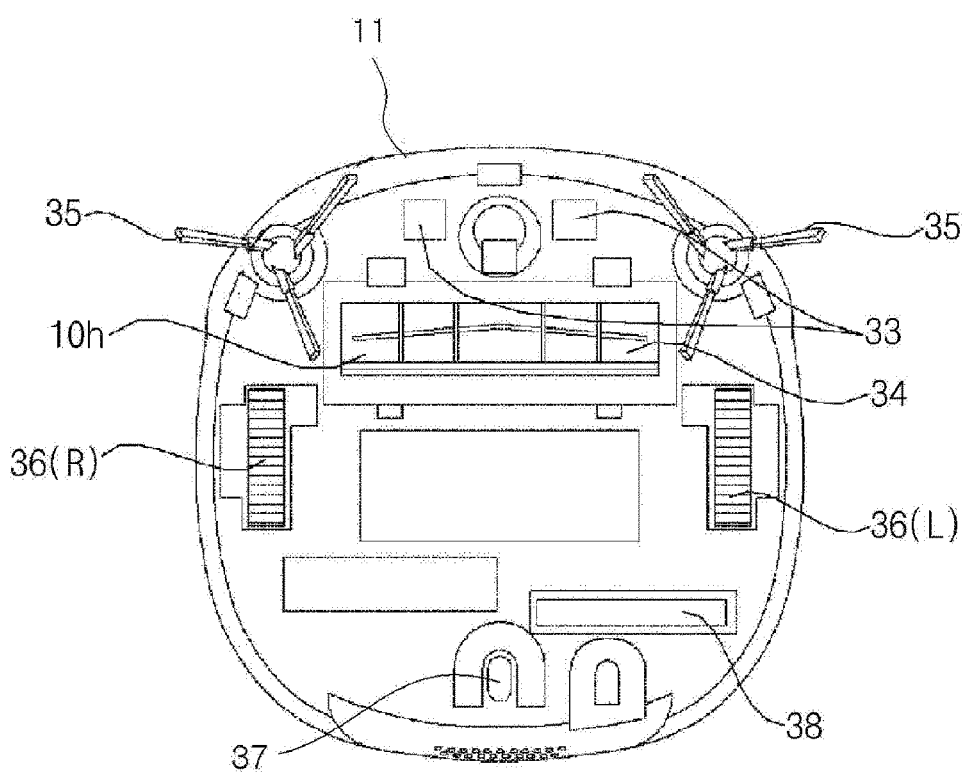
FIG. 4 is a bottom view of the robot cleaner of FIG. 1.

In FIG. 2, "θh" designates the horizontal emission angle of the first patterned light P1 from the first pattern irradiator 120. When the first pattern irradiator 120 emits a first patterned light P1 that includes a horizontal light segment Ph, the horizontal emission angle θh may correspond to the angle between opposite ends of the horizontal line segment Ph. The horizontal emission angle θh of the first patterned light P1 may range from about 130 degrees to 140 degrees, but it should be appreciated that different types of first pattern irradiator 120 may output different horizontal emission angles θh. For example, the first pattern irradiator 120 may have a wider horizontal emission angle θh (e.g., greater than 140 degrees) or a narrower horizontal emission angle θh (e.g., less than 130 degrees).

The width of the horizontal line segment Ph at a given distance from first pattern irradiator 120 may vary based on the horizontal emission angle θh. Thus, when the horizontal emission angle θh increases, the width of the horizontal line segment Ph also increases at a given distance. As shown in FIG. 2, the width of the horizontal line segment Ph may also vary in proportion to a distance from robot body, for a given horizontal emission angle θh. As described below, the width of a detected optical pattern associated with a reflection of the horizontal line segment Ph from an obstacle, as detected by image obtainer 140, may be used to determine a distance of the obstacle from the main body 10.

FIG. 2 depicts a dotted line that extends from the front side of the robot cleaner 1, and the first patterned light P1 may be symmetrical about the dotted line. For example, half of the horizontal line segment in the first patterned light P1 may be radiated to the right side of the mobile body 10, and another half of the horizontal line segment in the first patterned light P1 may be radiated to the left side of the mobile body 10.

When the second pattern irradiator 130 emits the second patterned light P2, the horizontal emission angle θh may also correspond to the angle between opposite ends of the second patterned light. In one example, a horizontal emission angle of the second patterned light P2 emitted by the second pattern irradiator 130 may range from about 130 degrees to 140 degrees, but it should be appreciated that different types of second pattern irradiator 130 may output different horizontal emission angles θh. In some embodiments, the second pattern irradiator 130 may emit the second patterned light P2 at the same horizontal emission angle as the first pattern irradiator 120. For example, the horizontal light segment Ph of P1 and the second patterned light P2 may have similar widths when contacting a common vertical surface and or different surfaces positioned at a similar distance from the main body 10. In one case, the second patterned light P2 may also be symmetrical about the dotted line illustrated in FIG. 2, such that substantially half the second patterned light P2 is emitted by the second pattern irradiator 130 to a right side of the main body 10, and another half the second patterned light P2 is emitted by the second pattern irradiator 130 to a left side of the main body 10.

The image obtainer 140 may capture an image of an area in front of the main body 10. As used herein, the term "front" is associated with a direction in which the main body 10 is travelling and/or a portion of the main body 10 wherein the obstacle sensing unit 100 is mounted. For example, the patterned lights P1 and P2 may be emitted toward the area captured in the image obtained by the image obtainer 140 (hereinafter referred to as "obtained image"). Hereinafter, reflections of the patterned light P1 and P2 in the obtained image are referred to as "optical patterns." Since the optical patterns may substantially correspond to reflected portions of the patterned light P1 and P2, the optical patterns are referred to, herein, using the same reference numerals as the patterned light P1 and P2. That is, respective images corresponding to the first patterned light P1 and the second patterned light P2 are referred to, herein, as a first optical pattern P1 and a second optical pattern P2.

The image obtainer 140 may include a digital camera that converts an object image into an electrical signal, and changes the electrical signal into a digital signal so as to store the digital signal in a memory (e.g., in data storage 240). The digital camera may include an image sensor (not illustrated) and an image-processing module (not illustrated). The image sensor is a device that converts an optical image into an electrical signal, and may be configured as an integrated chip having a plurality of photo diodes. For example, the photo diodes may be pixel sensors or other types of optical sensor. The respective pixel sensors may accumulate charges corresponding to different levels (i.e., brightness or intensities) of light from the area in the captured image after the light passed through a lens, and the charges accumulated in the pixels may be converted into an electrical signal (e.g. a voltage) that varies based on the detected intensity of the received light. The image sensor may be any one of well-known elements such as a charge-coupled device (CCD) or a complementary metal oxide semiconductor (CMOS).

The image obtainer 140 may produce a digital image based on an analog signal output by the image sensor. The image obtainer 140 may include an analog-to-digital (AD) converter that converts the analog signal into a digital signal, a buffer memory that temporarily records digital data according to the digital signal output from the AD converter, and a digital signal processor (DSP), which forms a digital image by processing the digital data recorded in the buffer memory.

Figure 5:
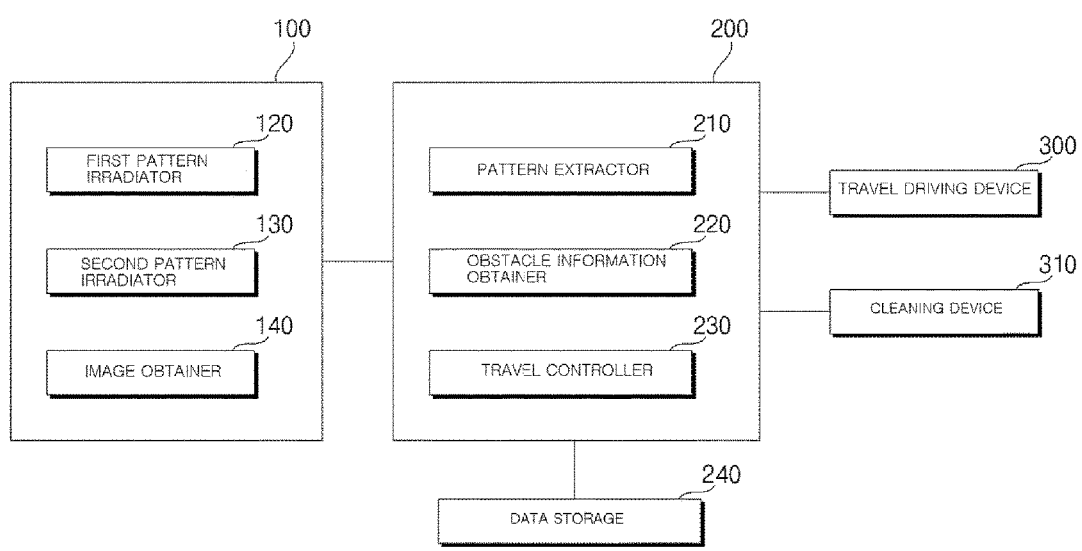
FIG. 5 is a block diagram illustrating the major elements of the robot cleaner of FIG. 1.

Referring to FIG. 5, the controller 200 may include a pattern extractor 210, which detects the optical patterns P1 and P2 from the image captured by the image obtainer 140 (i.e. the obtained image). The pattern extractor 210 may detect features, such as dots, lines, planes or other shapes, with respect to predetermined pixels which constitute the obtained image, and may detect the optical patterns P1 and P2 or the dots, lines, and planes constituting the optical patterns P1 and P2 based on the detected features. For example, the pattern extractor 210 may extract lines formed by successive pixels that are brighter than the surroundings, thereby extracting the horizontal line Ph and the vertical line Pv included in the first optical pattern P1, and the horizontal line included in the second optical pattern P2. However, the present disclosure is not limited thereto, and various methods of extracting a desired pattern from a digital image are known. Thus, the pattern extractor 210 may extract the first optical pattern P1 and the second optical pattern P2 using any one of these known technologies.

Hereinafter, an angular difference between a direction that the first pattern irradiator 120 or the second pattern irradiator 130 emits light and a horizontal plane (e.g., parallel to a surface on which the robot cleaner is traveling) may be referred to as a vertical emission angle ($\theta r$). Specifically, the vertical emission angle may correspond to the angle between the directions in which the pattern irradiator 120 or 130 emit the first optical pattern P1, or the second optical pattern P2 and the horizontal plane.

The first pattern irradiator 120 and the second pattern irradiator 130 may be symmetrically arranged in a vertical alignment. More particularly, the first pattern irradiator 120 and the second pattern irradiator 130 may be arranged on a predetermined vertical line, the first pattern irradiator 120 may emit the first patterned light P1 downward at a first vertical emission angle, and the second pattern irradiator 130 may emit the second patterned light P2 upward at a second vertical emission angle. The first vertical emission angle and/or the second vertical emission angle may range from 20 degrees to 30 degrees, but it should be appreciated that one or more of the first pattern irradiator 120 or the second pattern irradiator 130 may emit light output at different vertical emission angles.

The first vertical emission angle and the second vertical emission angle may be a same angle $\theta r$ when the first pattern irradiator 120 and the second pattern irradiator 130 are symmetrically arranged. In other examples, the first vertical emission angle and the second vertical emission angle may be different from each other, such that the first pattern irradiator 120 and the second pattern irradiator 130 emit light patterns at different angular distances relative to the horizontal plane. The angle $\theta r$ may range, for example, from 20 degrees to 30 degrees, but one or more of the first pattern irradiator 120 or the second pattern irradiator 130 may output patterned lights at different vertical emission angles.

Figure 7:
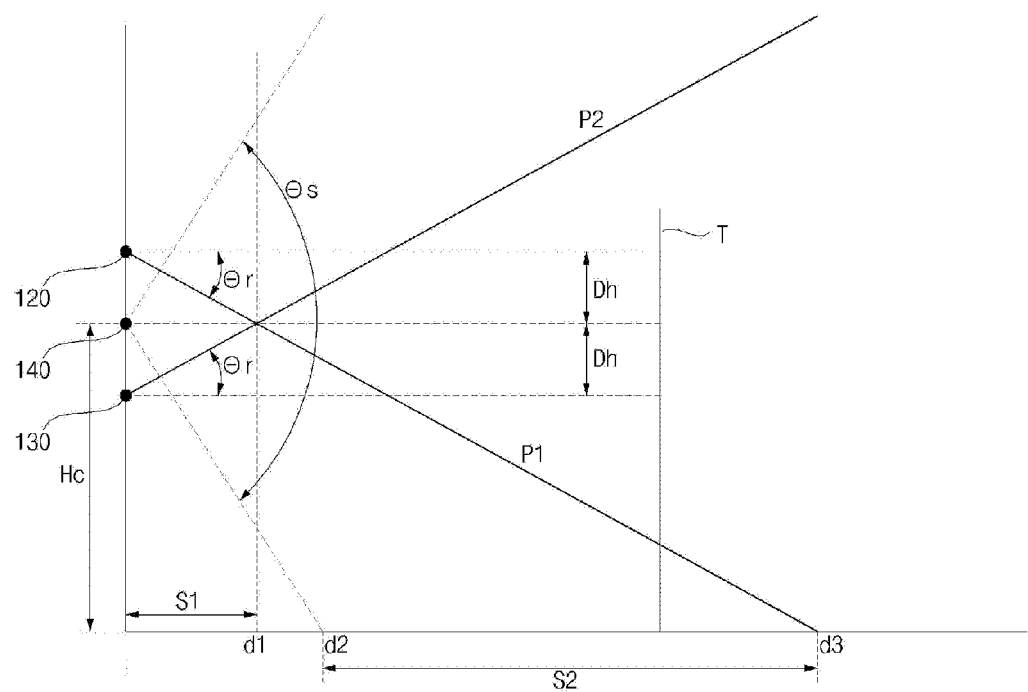
FIG. 7 is a view illustrating the irradiation range and the obstacle detection range of the obstacle-sensing unit.

As previously described, the first pattern irradiator 120 and the second pattern irradiator 130 may be positioned symmetrically relative to (i.e., equal distance from) the image obtainer 140. Referring to FIG. 7, the first pattern irradiator 120 may be upwardly spaced apart from the image obtainer 140 by a distance Dh, and the second pattern irradiator 130 may be downwardly spaced apart from the image obtainer 140 by a similar distance Dh. Furthermore, the first pattern irradiator 120 and the second pattern irradiator 130 may output patterned lights at similar vertical emission angle relative to the centered image obtainer 140. In this configuration in which the first pattern irradiator 120 and the second pattern irradiator 130 are symmetrically arranged relative the image obtainer 140 and emit patterned lights at similar vertical emission angles $\theta r$ in opposite directions, calibration or product initialization may be performed in the manner described below.

When the patterned light emitted from the first pattern irradiator 120 and/or the second pattern irradiator 130 is radiated on an obstacle, the positions of the optical patterns P1 and P2 in the obtained image varies according to a distance between the obstacle-sensing unit 100 and the obstacle. For example, when the first patterned light P1 and the second patterned light P2 are radiated toward an obstacle, the first optical pattern P1, and more specifically, the horizontal line Ph, appears higher in the image as when the obstacle is closer to the robot cleaner 1. Similarly, the second optical pattern P2 is located lower in the obtained image when the obstacle is closer to the robot cleaner 1. Conversely, the first optical pattern P1 may appear lower and the second optical pattern P2 may appear higher when the obstacle is farther from the robot cleaner 1.

In one implementation, the robot cleaner 1 may store (e.g., in data storage 240) data identifying respective heights of the first optical pattern P1 and/or the second optical pattern P2 in an image of an obstacle positioned at a known distance (e.g., 10 cm) from the robot cleaner 1. Subsequently, this data identifying the heights for the first optical pattern P1 and/or the second optical pattern P2 for an obstacle at the given height may be used to determine a distance between the robot cleaner 1 and another obstacle. For example, image obtainer 140 may capture an image of the other obstacle, and the heights for the first optical pattern P1 and/or the second optical pattern P2 in the image may be compared to the stored height values. As previously described, the first patterned light P1 may appear higher in the image and the second patterned light P2 may appear lower in the image as robot cleaner 1 moves closer to an obstacle. Thus, the position of the obstacle may be determined to be closer than the given distance when the first patterned light P1 is higher in the image and/or the second patterned light P2 is lower in the image. Furthermore, an exact distance between the robot cleaner 1 and the obstacle may be estimated from based on the difference between the heights of the first patterned light P1 and/or the second patterned light P2 in the image and the stored height values associated with an obstacle positioned at the given distance.

In order to accurately perform the above-described distance measuring process, each of the first pattern irradiator 120 and the second pattern irradiator 130 may be aligned so as to accurately emit light at a preset vertical emission angle θr. Whether or not this precondition is satisfied may be inspected using a calibration process, such as the following process. When the obstacle-sensing unit 100 is fixed at a particular position on the main body 10, and a vertical incident plane T (see FIG. 7) that faces the obstacle-sensing unit 100 may be located at a given distance in front of the obstacle-sensing unit 100. The position of the incident plane T may be the position at which the first patterned light P1 is focused.

In this state, the first pattern irradiator 120 emits patterned light P2, and the image obtainer 140 obtains an image. The first optical pattern P1 incident on the incident plane T is displayed in the obtained image. Here, since the distance from the obstacle-sensing unit 100 to the incident plane T is already known, the horizontal line Ph of the first optical pattern P1 is located at a predetermined position ref1 (hereinafter referred to as a "reference position") in the obtained image so long as the obstacle-sensing unit 100 is normally manufactured without defects.

Figure 8:
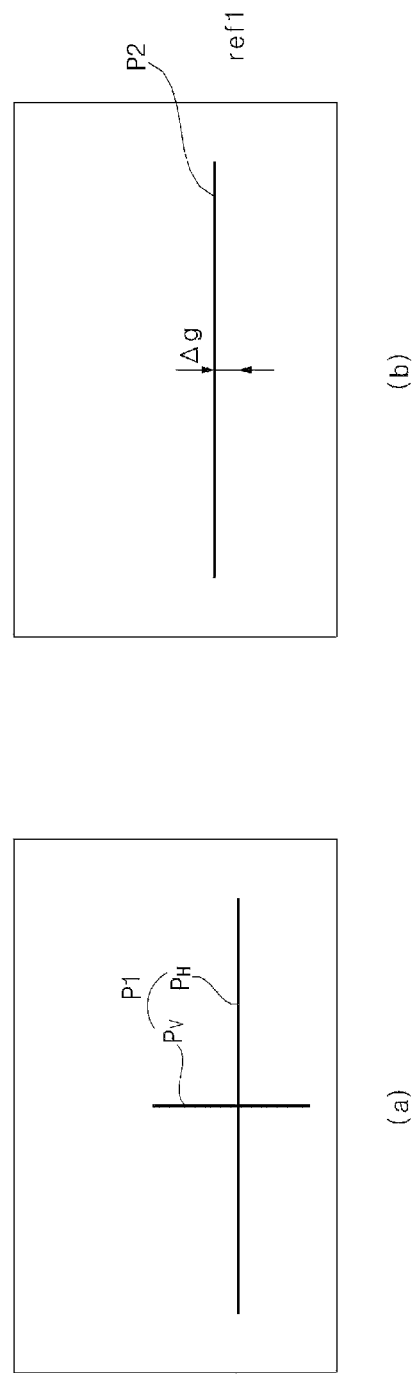
FIG. 8 shows views respectively illustrating first patterned light displayed in an obtained image in the process of calibrating a first pattern irradiator and second patterned light displayed in an obtained image in the process of calibrating a second pattern irradiator.

The reference position ref1 is a criterion for judging a state, in which there is no obstacle in front of the robot cleaner and the robot cleaner 1 is placed is flat floor surface (i.e., a condition referred herein as a "normal state"). The reference position ref1 is a position at which the first optical pattern P1 is displayed when the main body 10 is located on a flat floor. Referring to FIG. 7, when the first optical pattern P1 is irradiated toward a position d3, the image obtainer 140 captures an image in which the first optical pattern P1 is located at the reference position. FIG. 8(a) illustrates the first optical pattern P1 displayed in the obtained image in the above-described process, and illustrates the case where the horizontal line Ph is detected at the reference position ref1.

Then, the process of inspecting the direction in which the second pattern irradiator 130 emits patterned light may be performed by repeating the above-described calibration process after turning the obstacle-sensing unit 100 upside down. That is, after the obstacle-sensing unit 100 is turned upside down so that the second pattern irradiator 130 is located above the image obtainer 140 and emits the second patterned light P2 in a downward direction toward a floor, the image obtainer 140 obtains an image in which the second optical pattern P2 is in focus at the incident plane T. When the second optical pattern P2 is positioned at the reference position ref1, the second pattern irradiator 130 is in a normal state (i.e., is emitting light at a similar vertical emission angle θr as the first pattern irradiator 130). However, when the second pattern irradiator 130 is in an abnormal state, the second optical pattern P2 is located in the obtained image at a position that differs from the reference position ref1. For example, when the second optical pattern P2 is located in the obtained image at a position that is upwardly spaced apart from the reference position ref1 by a distance Δg, as illustrated in FIG. 8(b), this image indicates that the vertical emission angle of the second pattern irradiator 130 is less than a preset value for θr. Therefore, the vertical emission angle of the second pattern irradiator 130 may be adjusted to the desired value θr.

In another example, when the distance Δg is within a preset tolerance range, the distance Δg may be stored in the data storage so as to be used later in order to compensate for the position of the second optical pattern P2 in other captured images. For example, a position of a second optical pattern P2 in other captured images may adjusted by the error distance Δg when calculating the distance between the robot cleaner 1 and an obstacle.

The image obtainer 140 may be aligned so that the optical axis of the lens is oriented in the horizontal direction, and the angle θs illustrated in FIG. 7 is the view angle of the image obtainer 140. The view angle θs may correspond to a vertical view of view for the image obtainer 140 and may be set to 100 degrees or more. For example, the view angle θs may range from 100 degrees to 110 degrees, but it should be appreciated that the image obtainer 140 may have a view angle θs with different ranges of values. In one implementation, a distance (Hc) from the floor in the cleaning zone to the image obtainer 140 may range from approximately 145 mm to approximately 155 mm.

Referring to FIG. 7, in the obtained image from the image obtainer 140, the floor in the cleaning zone may appear after the position designated by d2. In other words, the position designated by d2 may correspond to a closest portion of the floor within the view angle θs captured by the image obtainer 140. Continuing with FIG. 7, "S2" designates the area of the floor from the position d2 to the position d3, which is the center of the first optical pattern P1 (i.e. the intersection of the horizontal line Ph and the vertical line Pv) in the obtained image in the normal state. When an obstacle is located in the area S2, the image obtainer 140 may obtain an image of the obstacle on which the first patterned light P1 is radiated. If the obstacle is located further from the robot cleaner 1 than position d3, the first pattern light P1 may strike the floor before reaching the obstacle. In one example, the distance from the main body 10 to the position d2 may be set to a range from 100 mm to 120 mm, and the position d3 may be located at a distance of approximately 400 mm from the robot cleaner 1, without being unnecessarily limited thereto.

In addition, in FIG. 7, "S1" designates the area in which the vertical positions of the first optical pattern P1 and the second optical pattern P2 are reversed (i.e. the area from the robot cleaner 1 to a position d1 where the first patterned light P1 and the second patterned light P2 cross). When an obstacle is located in the area 51, the first optical pattern P1 is located above the second optical pattern P2 in the obtained image. In one example, the position d1 may be the position that is spaced apart from the robot cleaner 1 by a distance ranging from 70 mm to 80 mm, without being unnecessarily limited thereto. For example, d1 may vary based on the vertical emission angles of first pattern irradiator 120 and the second pattern irradiator 130.

FIG. 9 shows views respectively illustrating a first image that is obtained when the robot cleaner is at a first position in which an obstacle is located in front of the robot cleaner and a second image that is obtained when the position of the robot cleaner is changed to a second position. When an obstacle OB1, such as a bed defining a predetermined space A along with a floor, is located in the cleaning zone, the robot cleaner 1 may recognize the space A, and more particularly, may detect the height of the space A. Then, the robot cleaner 1 may determine to pass or avoid the obstacle OB1 based on the detected result.

For example, as illustrated in FIG. 9(a), the first patterned light P1 may be radiated on the floor in the space A, and the second patterned light P2 may be radiated on a structure (i.e., an obstacle OB1) that is located above the space A (e.g. a frame that supports a bed mattress). The obstacle information obtainer 220 included in the controller 200 may recognize that the obstacle OB1 is located above the portion of the floor on which the first patterned light P1 is radiated. For example, obstacle information obtainer 220 may determine that the first patterned light P1 is positioned at a corresponding reference location in the obtained image associated with a normal state (i.e., when an obstacle is not present on the floor), but that the second patterned light P2 positioned at a height indicating the presence of an obstacle The obstacle information obtainer 220 may then determine a distance from the robot cleaner 1 to the obstacle OB1 based on a difference between the vertical position of the second optical pattern P2 in the obtained image and a reference position for the second optical pattern P2 on an obstacle at a given distance, as previously described.

The obstacle information obtainer 220 may determine the height of the space A. For example, the obstacle information obtainer 220 may determine a lowest portion of the obstacle OB1 on which the second patterned light P2 is radiated, and determine a distance between this lowest portion and the floor in the cleaning zone based on and the vertical emission angle of the second pattern irradiator 130 and the distance to the obstacle OB1. When it is determined that the height of the space A is less than the height of the main body 10, the travel controller 230 may control the travel driving device 300 so that the main body 10 travels so as to avoid the obstacle OB1. Conversely, when it is determined that the height of the space A is greater than the height of the main body 10, the travel controller 230 may control the travel driving device 300 so that the main body 10 enters or passes through the space A.

In an example illustrated in FIG. 9(b), the vertical line Pv of the first patterned light P1 is radiated on the wall, and the horizontal line Ph is radiated on the floor. In this example, a portion of the second patterned light P2 is radiated on the obstacle OB1 and the remaining portion of the second patterned light P2 is radiated on the wall at a different, higher height. Because the first optical pattern P1 in the obtained image substantially corresponds with the first patterned light p1 from the first pattern irradiator 120, the controller 200 may determine that no obstacle is located on the floor before the robot cleaner 1, the presence of a wall in front of the robot cleaner 1 may be recognized. However, since the second patterned light P2 horizontal portions at two different heights (i.e., a first portion at a lower height on the obstacle OB1 and a second portion at a higher height on the rear wall), the controller 200 may identify a lateral edge of the obstacle OB1 at a location corresponding to the change in heights of the portions of the second patterned light P2. If the second patterned light P2 were not radiated, the robot cleaner 1 may erroneously determine that the OB1 is not present since the first optical pattern P1 is located at a reference position in the obtained image.

FIG. 10 is a view illustrating an image obtained when the first patterned light and the second patterned light are radiated on an obstacle (OB2) positioned on a floor and that extends to height above a vertical emission level for the second patterned light P2. Additionally, the obstacle OB2 is narrower than the emission widths of the first pattern light P1 and the second patterned light P2. Referring to FIG. 10, the robot cleaner 1 may recognize a shape of a forward surface of the obstacle OB2 based on the first patterned light P1 and/or the second patterned light P2. For example, the robot cleaner 1 may recognize a distance between the robot cleaner 1 and a front (i.e., closest to the robot cleaner 1) surface of the OB2 based on the heights of portions of the first pattern light P1 and the second patterned light P2 on the of the OB2. For example, the robot cleaner 1 may determine that the front surface of the obstacle OB2 is closer than the back wall since the image includes a portion of the first pattern light P1 that is positioned above a reference position (i.e., the height on the floor at the sides of the obstacle OB2) and a portion of the second pattern light P2 that is positioned below a reference position (i.e., the height on the wall at the sides of the obstacle OB2). The distance between the robot cleaner 1 and the obstacle OB2 may be determined, for example, based on the difference between the height of the portion of the first pattern light P1 on the obstacle OB2 and a reference position associated with a normal state.

Since the portion of the first pattern light P1 is higher than the reference position associated with a normal state, the robot cleaner 1 may determine that the obstacle is positioned on a floor in front of the robot cleaner 1. Furthermore, since the portion of the first pattern light P2 is included in the image, the robot cleaner 1 may determine that a height of an obstacle OB2 extends above the height of the second pattern irradiator 120 such that the robot cleaner 1 cannot pass over obstacle OB2. Therefore, the travel controller 230 may control the main body 10 so as to travel toward the obstacle OB2, and when it is determined that the obstacle OB2 is taller than a height of second pattern irradiator, the travel controller 300 may control the main body 10 to move so as to avoid the obstacle OB2. Furthermore, the robot cleaner 1 may determine lateral side edges of the obstacle OB2 based on the changes in heights of portions of the first light pattern P1 and/or portions of the second light pattern P2. For example, the robot cleaner 1 may determine that front surface of the obstacle OB2 does not extend to portions of the first light pattern P1 and/or portions of the second light pattern P2 at heights associated with a clean state.

In another example, the obstacle information obtainer 220 may recognize a cliff that is located in front of the robot cleaner 1 based on the length of the vertical line Pv that is displayed in the obtained image. When the cliff (e.g. a stair) is located in front of the robot cleaner 1, the length of the vertical line Pv in the obtained image is reduced. For example, a lower portion of the vertical line Pv in the first light pattern P1 may indicate a portion of floor in front of the robot cleaner, but the image does not include an upper portion of the vertical line Pv since this upper portion is irradiated toward a space beyond the cliff. Furthermore, a distance from the robot cleaner 1 to the cliff may be determine based on the length of the vertical line Pv. For example, as the robot cleaner 1 moves toward a cliff, increasing portions of the vertical line Pv are irradiated beyond the cliff and will not be reflected by the floor to be captured in the image. Thus, when the length of the vertical line Pv is reduced, the obstacle information obtainer 220 may recognize that the cliff is located in front of the robot cleaner 1, and based on the recognized cliff information, the travel controller 230 may control the travel driving device 300 so that the robot cleaner 1 may travel along a path such that it does not fall off the cliff.

Figure 11:
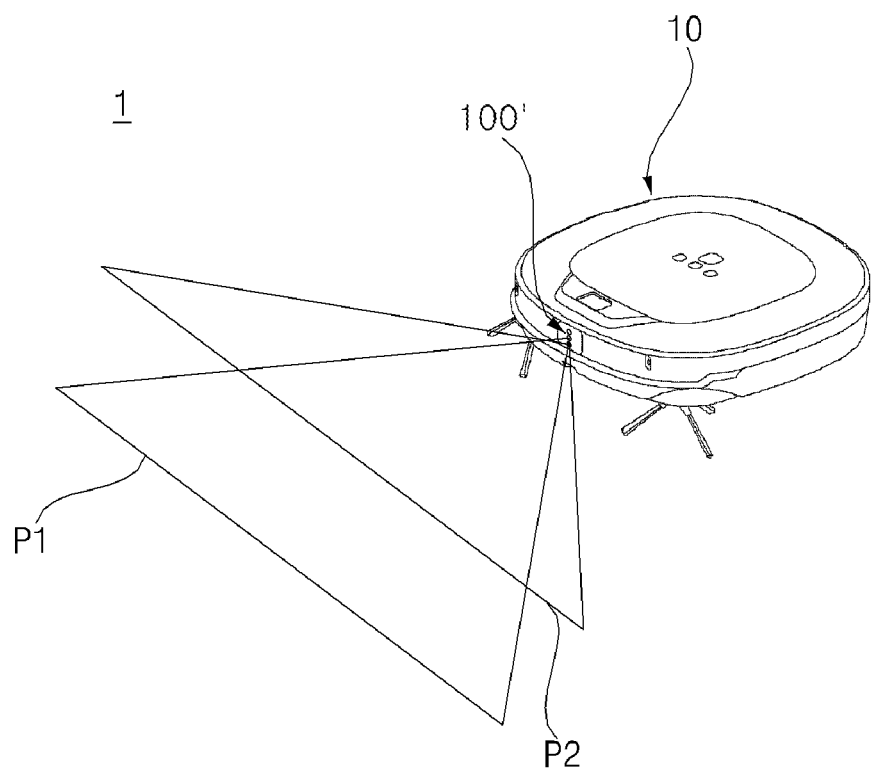
FIG. 11 is a perspective view of a robot cleaner according to another embodiment of the present disclosure.
Figure 12:
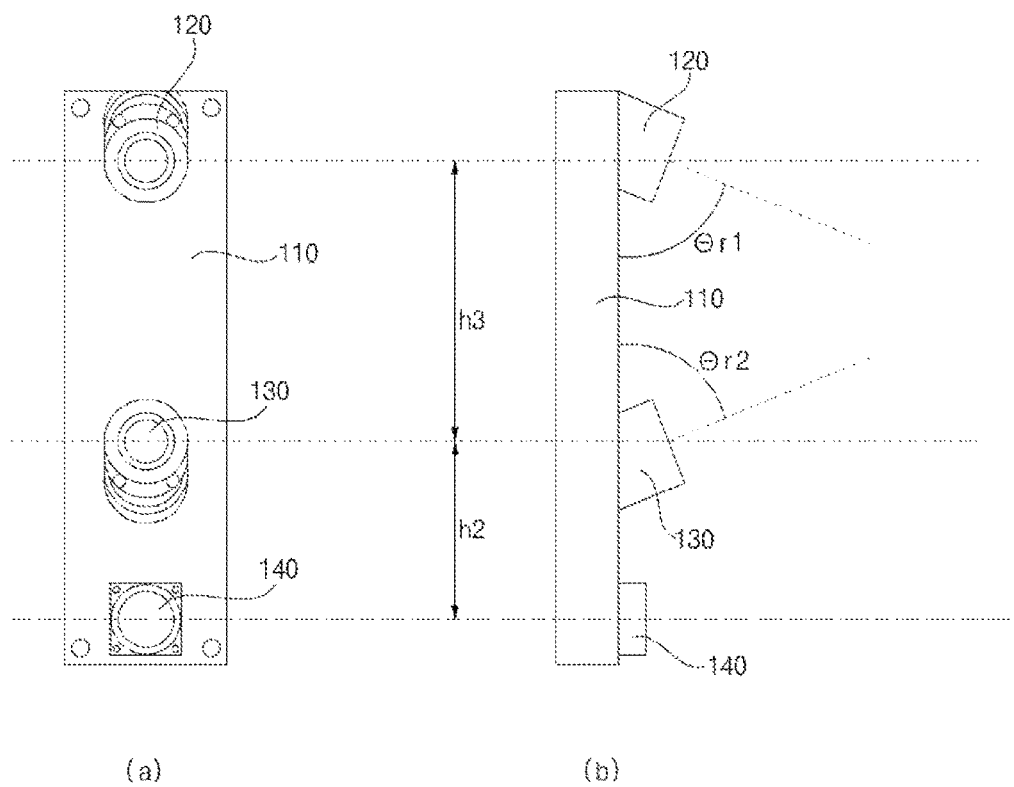
FIG. 12 shows a front view and a side view of an obstacle-sensing unit illustrated in FIG. 11.

Referring to FIGS. 11 and 12, an obstacle-sensing unit 100' may include the first pattern irradiator 120, the second pattern irradiator 130, and the image obtainer 140. The image obtainer 140 may obtain an image of a predetermined area in front of the main body 10 in manner previously described. Similar to the implementation depicted in FIG. 6, the first pattern irradiator 120 may emit a first pattern of light downward to the area in front of the robot cleaner, and the second pattern irradiator 130 may be located below the first pattern irradiator 120 and may emit a second pattern of light upward to the area.

As previously described, the first pattern irradiator 120 may emit the first patterned P1 to an area lower than and in front of the main body 10. For example, the first patterned light P1 may be radiated on the floor in the cleaning zone.

The first patterned light P1 may have a horizontal line segment (Ph). In addition, the first patterned light P1 may also include a vertical line (Pv) that crosses the horizontal line segment (Ph) to form cross-shaped pattern (see, for example, FIG. 1).

The first pattern irradiator 120, the second pattern irradiator 130, and the image obtainer 140 may be vertically aligned. In the example depicted in FIG. 12, the image obtainer 140 is located below the first pattern irradiator 120 and the second pattern irradiator 130. It should be appreciated, however, that in other examples, the location of the image obtainer 140 may change, such as providing the image obtainer 140 above the first pattern irradiator 120 and the second pattern irradiator 130.

Continuing with the example shown in FIG. 12, the first pattern irradiator 120 may be located at the uppermost position on a module frame 110, and may emit the first patterned light P1 forward and downward so as to position the first patterned light P1 on an obstacle that is located lower than the first pattern irradiator 120. The second pattern irradiator 130 may be located below the first pattern irradiator 120, and may emit the second patterned light P2 forward and upward. Thus, the second patterned light P2 may be radiated on the wall surface, or an obstacle or a specific portion of the obstacle that is located higher than the second pattern irradiator 130. The second patterned light P2 may have a different pattern from that of the first patterned light P1, and may include a horizontal line segment. The first patterned light P1 and the second patterned light P2 may have different visual characteristics to enable the robot cleaner 1 to visually distinguish first patterned light P1 and the second patterned light P2. As previously described, the first patterned light P1 and the second patterned light P2 may have different shapes. In another example, the horizontal line portion of the second patterned light P2 be a continuous line or may be a dotted (i.e., intermittent) line. In other examples, the first patterned light P1 and the second patterned light P2 may have different colors, brightness levels, phases, etc.

The horizontal emission angle θh (see FIG. 2) of the first pattern irradiator 120 may range from 130 degrees to 140 degrees, without being unnecessarily limited thereto. Similar to the first pattern irradiator 120, the horizontal emission angle of the second pattern irradiator 130 may range from 130 degrees to 140 degrees. In some embodiments, the second pattern irradiator 130 may emit the patterned light P2 at the same horizontal emission angle as the first pattern irradiator 120 such that the first patterned light P1 and the second patterned light P2 have similar widths.

Figure 13:
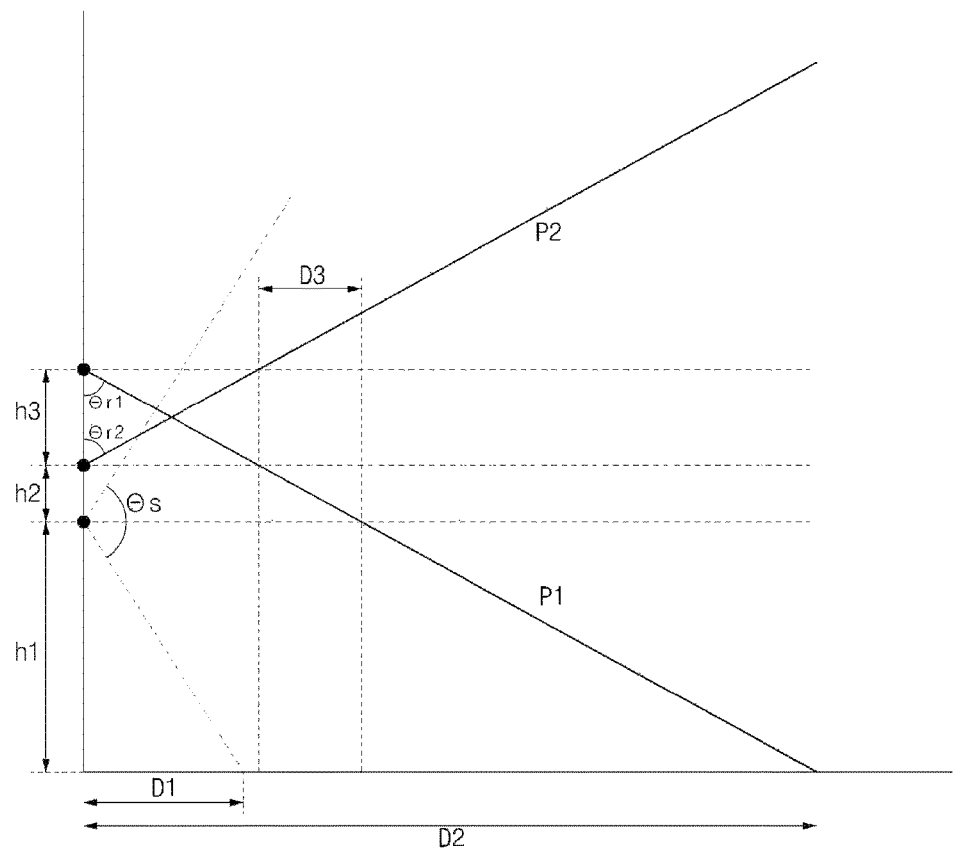
FIG. 13 is a view illustrating the irradiation range and the obstacle detection range of the obstacle-sensing unit.

Referring to FIGS. 12 and 13, the first pattern irradiator 120 and the second pattern irradiator 130 may be symmetrically arranged such that a vertical emission angle θr1 for the first pattern irradiator 120 downward from a horizontal plane corresponds to a vertical emission angle θr2 for the second pattern irradiator 130 upward from a horizontal plane. The first pattern irradiator 120 and the second pattern irradiator 130 may be arranged at the upper and lower positions at a distance h3. The first pattern irradiator 120 emits the first patterned light downward and the second pattern irradiator 130 emits the second patterned light upward so that the first patterned light and the second patterned light cross each other.

The image obtainer 140 may capture an image of an area in front of the main body 10. The image obtainer 140 may be downwardly spaced apart from the second pattern irradiator 130 by a distance h2 and may capture an image of the area in front of the main body 10 at a view angle θs relative to the vertical direction. The image obtainer 140 is installed at a distance h1 from the floor. The image obtainer 140 may be installed at a position such that the capture of the image of the area in front of the robot cleaner 1 is not obstructed in consideration of a bumper (not illustrated) or other portion of the casing 11 that forms a lower end of the front surface portion of the main body 10 or the shape of some other traveling or cleaning structure.

The first pattern irradiator 120 or the second pattern irradiator 130 is installed so that the direction in which the optical axis of the lens thereof extends forms a predetermined emission angle. The first pattern irradiator 120 emits the first patterned light P1 downward at the first vertical emission angle θr1, and the second pattern irradiator 130 emits the second patterned light P2 upward at the second vertical emission angle θr2. The first vertical emission angle and the second vertical emission angle may be set to be similar, in some implementations. For example, the first vertical emission angle and the second vertical emission angle may range from 50 degrees to 75 degrees, without being unnecessarily limited thereto. For example, the first vertical emission angle may be set to a range from 60 degrees to 70 degrees, and the second vertical emission angle may be set to a range from 50 degrees to 55 degrees. These angles may be changed according to the structure of a lower bumper of the robot cleaner 1, the sensed distance to an object below the robot cleaner 1, the height to be sensed, etc.

When the patterned light emitted from the first pattern irradiator 120 and/or the second pattern irradiator 130 is radiated on an obstacle, the positions of the optical patterns P1 and P2 in the obtained image are changed depending on a distance between the obstacle and the robot cleaner 1. For example, when the first patterned light P1 and the second patterned light P2 are radiated on an obstacle, the first optical pattern P1 is moved higher in an obtained image, and the second optical pattern P2 is moved in the obtained image as the robot cleaner 1 moves toward the obstacle. As previously described, the first optical pattern P1 and/or the second optical pattern P2 may appear at particular height levels in an obtained image when an irradiated obstacle is located at a known distance. Any difference(s) between heights of the first optical pattern P1 and/or the second optical pattern P2 in an image and the particular height levels for the known distance may be used to estimate a distance between the robot cleaner and the obstacle.

The image obtainer 140 is aligned such that the optical axis of the lens is oriented in the horizontal direction, and the angle θs illustrated in FIG. 13 is the view angle of the image obtainer 140. The view angle θs may be set to 100 degrees or more. For example, the angle θs may range from 100 degrees to 110 degrees, without being unnecessarily limited thereto. In addition, the distance from the floor in the cleaning zone to the image obtainer 140 may range from approximately 60 mm to approximately 70 mm. In the obtained image from the image obtainer 140, the floor in the cleaning zone may appear after the distance D1 (i.e., within the lower view angle θs of the image obtainer 140). In FIG. 13, "D2" designates the distance of the floor in which the first optical pattern P1 is displayed in the obtained image when no obstacle is present on the floor (i.e., in a normal state). In the normal state, an image will show the first optical pattern P1 at a reference position (or height) ref1.

When an obstacle extending to the floor is located within the distance D2, the image obtainer 140 may obtain an image of the obstacle on which the first patterned light P1 is radiated. When the obstacle is within the distance D2 of the robot cleaner 1 (i.e., such that the radiated first patterned light P1 hits the obstacle before reaching the floor), the first optical pattern is displayed above the reference position ref1 in a captured image. Thus, a location of the first optical pattern P1 relative to the reference position ref1 may be used a criterion for judging whether an obstacle is present on a floor on which the robot cleaner is moving.

In one example, the distance D1 from the main body 10 may range from 100 mm to 150 mm, and the distance D2 from the main body 10 may range from 180 mm to 280 mm, without being unnecessarily limited thereto. In FIG. 13, "D3" designates the distance from the most protruding portion of the front surface portion of the main body 10 to the position at which the second patterned light P1 is radiated. Since the main body 10 senses obstacles while traveling, the distance D3 is the minimum distance within which the main body 10 may sense an obstacle at the front side (or the upper side) thereof without colliding with the obstacle. The distance D3 may be set to be approximately in a range from 23 mm to 30 mm.

In the manner described above, the obstacle information obtainer 220 may determine that a cliff (e.g., a stair) is present near the robot cleaner 1 when the first optical pattern P1 does not appear in an obtained image or when only a portion of the first optical pattern P1 appears in an obtained image. For example, the obstacle information obtainer 220 may determine that a cliff that is located in front of the robot cleaner 1 and within the distance D2 (see FIG. 13) when no first optical pattern is displayed in the obtained image. In particular, when the cliff (e.g. the stairs) is present in front of the robot cleaner 1, no first patterned light P1 is radiated toward the cliff but the cliff does not reflect the first patterned light P1, so the first optical pattern P1 will not appear in the obtained image. The obstacle information obtainer 220 may determine, based on the distance D2, that the cliff is present at the distance D2 from the front of the main body 10. For example, when the first patterned light P1 has a cross-shaped pattern, obstacle information obtainer 220 may determine a location of cliff based on a height where horizontal line section Ph disappears and where the vertical line section Pv appears in the captured image.

In addition, the obstacle information obtainer 220 may determine that the cliff is present at the left side or the right side of the robot cleaner 1 when a portion of the first optical pattern P1 (e.g., a portion of the horizontal line section Ph) is not included in the captured image. For example, the obstacle information obtainer 220 may determine that the cliff is present at the right side when a right portion of the first optical pattern is not included in the captured image. Accordingly, the obstacle information obtainer 220 may control the travel driving device 300 based on the recognized cliff information so that the robot cleaner 1 may travel along a path without falling off the cliff.

In addition, when the cliff is present at the front side, the travel controller 230 may cause the main body 10 to move forward a given distance, for example, the distance D2 or less, so as to again check whether or not the cliff is present using a cliff sensor (not shown) that is installed in the lower portion of the main body 10. In this way, the robot cleaner 1 may first identify the cliff via the obtained image, and may secondarily verifying the presence and location of the cliff via the cliff sensor after traveling a given distance toward the cliff.

The pattern extractor 210 extracts the first optical pattern or the second optical pattern from the obtained image that captured by the image obtainer 140, and provides the extracted first optical pattern P1 and/or second optical pattern P2 to the obstacle information obtainer 220. The obstacle information obtainer 220 analyzes the first optical pattern P1 or the second optical pattern P2 extracted from the obtained image to identify an obstacle. For example, the obstacle information obtainer 220 may compare the position of the first optical pattern P1 with the predetermined reference position ref1 so as to determine whether the obstacle is present on the floor, as previously described.

As illustrated in FIG. 14(a), when the horizontal line of the first optical pattern P1 is located at the reference position ref1, the existence of a normal state is suggested since no obstacle at floor level is detected. As previously described, the normal state is associated with the floor being even and flat such that the robot cleaner 1 can continuously travel because no obstacle is present in front of the robot cleaner 1.

In one implementation, the first pattern irradiator 120 is first used to emit the first patterned light P1 to determine whether an obstacle is detected in front of the robot cleaner, and the second pattern irradiator 130 is not used to detect the obstacle. For example, as illustrated in FIG. 14(b), when the horizontal line of the first optical pattern P1 is located higher than the reference position ref1, the obstacle information obtainer 220 may determine that an obstacle is present at the front side of the robot cleaner 1. After the obstacle in front of the robot cleaner 1 is detected based on the emission of the first patterned light P1, the second pattern irradiator 130 may be activated to radiate the second patterned light P2 toward the obstacle, and another image may be captured by image obtainer 140. When the second image includes the second optical pattern P2, the obstacle information obtainer 220 may determine that the obstacle is taller than a height of the second pattern irradiator 130 on the casing 11. Similarly, the obstacle information obtainer 220 may determine that the obstacle is shorter than the height of the second pattern irradiator 130 on the casing 11 when the second image excludes the second optical pattern P2.

When the obstacle is sensed via the obstacle information obtainer 220 as previously described, the travel controller 230 may control the travel driving device 300 based on the position and height of the obstacle. As previously described, the obstacle information obtainer 220 may determine the position and height of the sensed obstacle according to the positions of the first optical pattern P1 and the second optical pattern P2 (or omissions thereof) in the captured image. In addition, as previously described with respect to FIGS. 9 and 10, differences in heights of different portions of the first optical pattern P1 and/or the second optical pattern P2 may be used by the obstacle information obtainer 220 to determine a width of the obstacle, a space under an obstacle, slope of a floor, etc.

The travel controller 230 may determine whether to continuously travel toward the obstacle or to change directions so as to avoid the obstacle based on the obstacle information input from the obstacle information obtainer 220, and may control the travel driving device 300 based on the result of the determination. For example, the travel controller 230 may determine that the robot cleaner may travel over the obstacle when the height of the obstacle is less than a threshold height (e.g., when the second optical pattern P2 is not present in an image), or when the robot cleaner 1 can enter a space between the obstacle and the floor.

As illustrated in FIG. 14(c), the first optical pattern P1 may be displayed at a position lower than the reference position ref1. When the first optical pattern P1 is displayed at a position lower than the reference position ref1, the obstacle information obtainer 220 determines that a downward slope is present. The downward slope may be distinguished from a cliff because the first optical pattern P1 disappears when a cliff is present.

As illustrated in FIG. 14(*d*), the obstacle information obtainer 220 determines that a cliff is present in the travel direction when no first optical pattern is displayed. In addition, as illustrated in FIG. 14(*e*), when a portion of the first optical pattern is not displayed, the obstacle information obtainer 220 may determine that a cliff is present on the left side or the right side. In example shown in FIG. 14(*e*), the obstacle information obtainer 220 determines that a cliff is present on the left side of the main body 10 because a left portion of the horizontal pattern segment (Ph) is not present in the image.

In other example, in which the first optical pattern P1 includes a cross-shaped pattern, the obstacle information obtainer 220 may identify an obstacle based on both the position of a horizontal line and the position of a vertical line. Referring to FIG. 15, the obstacle information obtainer 220 may determine the position, size and shape of an obstacle when the patterned light emitted from the obstacle-sensing unit 100' is radiated on the obstacle and the corresponding optical pattern is displayed in the obtained image. As illustrated in FIG. 15(*a*), when a wall surface is present at the front side while traveling, the first patterned light is radiated on the floor and the second patterned light is radiated on the wall surface. Thereby, the first optical pattern P1 and the second optical pattern P2 are displayed as two horizontal lines in the obtained image. In this example, because a distance to the wall surface is greater than the distance D2, the second optical pattern is displayed and the first optical pattern P1 is displayed at the reference position ref1. In this situation, the obstacle information obtainer 220 may determine that an obstacle (i.e., a wall) is present but is located further than D2.

Meanwhile, when the distance from the main body 10 to a vertical surface of an obstacle is less than the distance D2, the first patterned light P1 is radiated on the surface of the obstacle, rather than the floor. Therefore, in the obtained image, the first optical pattern P1 is displayed above the reference position ref1, and the second optical pattern P2 continues to be positioned above the first optical pattern P1. The second optical pattern P2 is positioned in captured images at increasingly lower positions as the main body 10 moves closer to the obstacle, and the second optical pattern P2 is may be position in a captured image at a lower position compared to the situation in FIG. 15(*a*) in which distance from the main body 10 to the wall surface is greater than the distance D2. In either situation the second optical pattern P2 is displayed above the reference position and the first optical pattern P1. Thereby, the obstacle information obtainer 220 may calculate the distance to the obstacle, i.e. the wall surface via the heights of the first optical pattern P1 and the second optical pattern P2 in the image and/or a separation between first optical pattern P1 and the second optical pattern P2 in the image.

As illustrated in FIG. 15(*b*), when an obstacle such as, for example, a bed or a dresser, is present at the front side, the first patterned light P1 and the second patterned light P2 are respectively radiated, as two horizontal lines, on the floor and on the obstacle. The obstacle information obtainer 220 determines the obstacle based on the first optical pattern and the second optical pattern. The obstacle information obtainer 220 may determine the height of the obstacle based on the position of the second optical pattern P2 and variation in the second optical pattern that occurs while the main body 10 approaches the obstacle. Thereby, the travel controller 230 determines whether or not the robot cleaner 1 can enter a space below the obstacle and controls the travel driving device 300 based on the result of the determination.

For example, when an obstacle, such as a bed, that defines a predetermined space along with the floor is present in the cleaning zone, the travel controller 230 may recognize the space. More particularly, the travel controller 230 may recognize the height of the space and determine whether to pass through or avoid the obstacle. When it is determined that the height of the space is less than the height of the main body 10, the travel controller 230 may control the travel driving device 300 so that the main body 10 travels so as to avoid the obstacle. Conversely, when it is determined that the height of the space is greater than the height of the main body 10, the travel controller 230 may control the travel driving device 300 so that the main body 10 enters the space or passes through the space.

At this time, although the first optical pattern and the second optical pattern are displayed as two horizontal lines in FIG. 15(*a*) described above, the obstacle information obtainer 220 may distinguish the state of FIG. 15(*a*) and the state of FIG. 15(*b*) from each other because the distances between the first optical pattern and the second optical pattern are different. In addition, in FIG. 15(*a*), the position of the first optical pattern is displayed at a higher position than the reference position ref1 as the distance to the obstacle is reduced. However, as illustrated in FIG. 15(*b*), in the case of an obstacle that is located higher than the robot cleaner 1, even if the robot cleaner 1 approaches the obstacle within a given distance, the first optical pattern P1 is displayed at the reference position ref1 and the position of the second optical pattern P2 is changed. Therefore, the obstacle information obtainer 220 may distinguish the kind of the obstacle.

In an example shown in 15(*c*), the robot cleaner is positioned near a corner of an obstacle such as a bed or a dresser. In this example, the first patterned light P1 is radiated as a horizontal line on the floor, and the second patterned light P2 is radiated on the corner of the obstacle. Thus, a portion of the second patterned light P2 is displayed as a horizontal line and the remaining portion of the second patterned light P2 is displayed as a diagonal line. Since the second optical pattern is located at a higher position when the obstacle is farther from the main body 10, a portion of the second optical pattern is displayed as a upwardly bent diagonal line when it is radiated on the side surface of the obstacle, and another portion of the second optical pattern is displayed as a horizontal line when radiated on the front surface of the obstacle.

As illustrated in FIG. 15(*d*), when the main body 10 approaches the corner of a wall, a portion of the first patterned light P1 is displayed as a horizontal line at a position higher than the reference position ref1, another portion of the first patterned light P1, which is radiated on the side surface of the corner, is displayed as a downwardly bent diagonal line, and the remaining portion of the first patterned light P1, which is radiated on the floor, is displayed as a horizontal line at the reference position ref1. Similar to the situation shown in FIG. 15(*c*), the example depicted in FIG. 15D includes a portion of the second patterned light P2 that is displayed as a horizontal line, while a remaining portion of the second patterned light P2, which is radiated on the side surface of the corner, is displayed as an upwardly sloped diagonal line.

In another example, shown in FIG. 15(*e*) with respect to an obstacle that protrudes from the wall surface more than distance D2 from the robot cleaner 1, the first optical pattern P1 is displayed as a horizontal line at the reference position ref1. A portion of the second optical pattern P2, which is radiated on the protruding surface, is displayed as a horizontal line, another portion of the second optical pattern P2, which is radiated on the side surface of the protruding surface, is displayed as an upwardly bent diagonal line, and the remaining portion of the second optical pattern P2 is radiated on the wall surface and is displayed as a horizontal line at different height than the first portion of the second optical pattern P2. Thereby, the obstacle information obtainer 220 may determine the position, shape, and size (i.e., height) of the obstacle based on the positions and shapes of the first optical pattern P1 and the second optical pattern P2 in captured images.

The present disclosure provides a robot cleaner, which may obtain more concrete information regarding an obstacle using patterns of light emitted from two pattern irradiators, which are arranged at upper and lower positions. The present disclosure also provides a robot cleaner, which may have no risk of being jammed in a space having a predetermined height, which is defined between an obstacle such as a bed and the floor in a cleaning zone, while traveling. The present disclosure also provides a robot cleaner, which may more easily perform the process of calibrating a first pattern irradiator and a second pattern irradiator.

In accordance with one aspect of the present disclosure, the above and other aspects can be accomplished by a robot cleaner including a main body configured to travel in a cleaning zone and to suction a foreign substance on a floor in the cleaning zone, an image obtainer provided on the main body and configured to obtain an image of a predetermined area at a front side of the main body, a first pattern irradiator provided on the main body and configured to emit a first pattern of light downward to the area, and a second pattern irradiator provided on the main body at a position below the first pattern irradiator and configured to emit a second pattern of light upward to the area.

When viewed from a side surface of the main body, a path in which the first pattern of light is emitted and a path in which the second pattern of light is emitted may cross each other. An intersection of the path in which the first pattern of light is emitted and the path in which the second pattern of light is emitted may be located closer to the main body than a point on the floor at which an image begins to be obtained by the image obtainer.

The image obtainer may be aligned so that an optical axis of a lens is horizontally oriented and has a view angle ranging from 100 degrees to 110 degrees. The image obtainer may obtain an image of the floor from a position at which a distance from the main body ranges from 110 mm to 120 mm. Each of the first pattern and the second pattern may include a horizontal line. The first pattern of light and the second pattern of light may be configured by different patterns.

The image obtainer, the first pattern irradiator, and the second pattern irradiator may be vertically arranged in a line on a front surface of the main body. The image obtainer may be provided at a position lower than the first pattern irradiator and the second pattern irradiator. The first pattern irradiator may emit the first pattern of light at a first vertical emission angle, and the second pattern irradiator may emit the second pattern of light at a second emission vertical emission angle. The image obtainer may be provided between the first pattern irradiator and the second pattern irradiator. At least one of the first vertical emission angle and the second vertical emission angle may range from 20 degrees to 30 degrees.

The image obtainer, the first pattern irradiator, and the second pattern irradiator may be positioned on a substrate coupled to the front side of the casing. The substrate may be a printed circuit board (PCB) or flexible PCB wiring. At least one of the first pattern irradiator, and the second pattern irradiator may include a laser diode (LD) or a light-emitting diode (LED) to generate light and an optical pattern projection element (OPPE) to convert the light into the first or second patterns.

In accordance with another aspect of the present disclosure, there is provided a robot cleaner including an image sensor configured to capture images of a predetermined area in front of the robot cleaner. The robot cleaner also includes a first light source configured to emit a first pattern of light to a first sub-area of the predetermined area, and a second light source positioned below the first light source and configured to emit a second pattern of light to a second sub-area of the predetermined area. The robot cleaner may also include a controller configured to activate the first light source to determine whether an obstacle is present in the predetermined area, and to selectively activate the second light source based on determining that the obstacle is present in the predetermined area to determine a height of the obstacle. For example, the controller may determine whether the obstacle is present in the predetermined area based on a location of a first optical pattern associated with the first pattern of light in an image captured by the image sensor, and may determine the height of the obstacle based on a location of a second optical pattern associated with the second pattern of light in another image captured by the image sensor.

The image sensor, the first light source, and the second light source may be mounted to a frame on a front portion of the robot cleaner. The frame may position the image sensor lower than the first light source and the second light source. Alternatively, the frame positions the image sensor between the first light source and the second light source. For example, the frame may position the first light source and the second light source to be arranged symmetrically relative to the image sensor.

In accordance with another aspect of the present disclosure, there is provided a robot cleaner including a casing forming an external appearance of the robot cleaner, a left wheel and a right wheel rotatably provided on the casing, a suction module provided in the casing to suction a foreign substance on a floor in a cleaning zone, and an obstacle-sensing unit provided on a front surface of the casing, wherein the obstacle-sensing unit includes a module frame coupled to the front surface of the casing, an image obtainer provided on the module frame and configured to obtain an image of a predetermined area at a front side of the casing, a first pattern irradiator provided on the module frame and configured to emit a first pattern of light downward to the area, and a second pattern irradiator provided on the module frame at a position below the first pattern irradiator and configured to emit a second pattern of light upward to the area.

When viewed from a side surface of the casing, a path in which the first pattern of light is emitted and a path in which the second pattern of light is emitted may cross each other. An intersection of the path in which the first pattern of light is emitted and the path in which the second pattern of light is emitted may be located closer to the casing than a point on the floor at which an image begins to be obtained by the image obtainer. Each of the first pattern and the second pattern may include a horizontal line. The image obtainer, the first pattern irradiator, and the second pattern irradiator may be vertically arranged in a line. The image obtainer may be provided at a position lower than the first pattern irradiator and the second pattern irradiator. The image obtainer may be provided between the first pattern irradiator and the second pattern irradiator. The first pattern irradiator and the second pattern irradiator may be symmetrically arranged relative to the image obtainer.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile robot comprising:
   a main body;
   an image sensor provided on the main body and configured to captured an image of a predetermined area at a front side of the main body;
   a first light source provided on the main body and configured to emit a first pattern of light to a first sub-area of the predetermined area; and
   a second light source provided on the main body at a position below the first light source and configured to emit a second pattern of light to a second sub-area of the predetermined area, the first sub-area being located lower than the second sub-area,
   wherein, when the main body is viewed from a lateral side while the main body is positioned on a horizontal floor:
   a first path in which the first pattern of light is emitted and a second path in which the second pattern of light is emitted intersect each other,
   a first point (d1), corresponding to vertically projecting a point where the first pattern of light and the second pattern of light intersect each other on to the horizontal floor, is located closer to the main body than a second point (d2) on the horizontal floor where the image is captured by the image sensor, and
   a first distance between the second point (d2) and a third point (d3) at which the first pattern of light is emitted on to the horizontal floor is greater than a second distance between the first point (d1) and the second point (d2).

2. The mobile robot according to claim 1, wherein the image sensor is aligned to have an optical axis that is horizontally oriented and has a view angle ranging from 100 degrees to 110 degrees.

3. The mobile robot according to claim 1, wherein the predetermined area captured by the image sensor in the image includes a portion of a floor that is positioned 110 mm to 120 mm from the front side of the robot.

4. The mobile robot according to claim 1, wherein each of the first pattern of light and the second pattern of light includes a horizontal line segment.

5. The mobile robot according to claim 1, wherein the first pattern of light and the second pattern of light are different.

6. The robot according to claim 1, wherein the image sensor, the first light source, and the second light source are vertically aligned on the front side of the main body.

7. The mobile robot according to claim 1, wherein the first light source emits the first pattern of light at a first vertical emission angle associated with angular distance from a horizontal plane that corresponds to a second vertical emission angle at which the second light source emits the second pattern of light.

8. The mobile robot according to claim 7, wherein at least one of the first vertical emission angle or the second vertical emission angle ranges from 20 degrees to 30 degrees.

9. The mobile robot according to claim 1, wherein the image sensor is provided between the first light source and the second light source.

10. The mobile robot cleaner according to claim 1, wherein at least one of the first light source and the second light source includes a laser diode (LD) or a light-emitting diode (LED) to generate light and an optical pattern projection element (OPPE) to convert the light into the first or second patterns of light.

11. The mobile robot according to claim 1, wherein the image sensor, the first light source, and the second light source are positioned on a substrate coupled to the front side of the main body.

12. The mobile robot cleaner according to claim 11, wherein the substrate is a printed circuit board (PCB) or flexible PCB wiring.

13. A mobile robot comprising:
   an image sensor configured to capture images of a predetermined area in front of the robot;
   a first light source configured to emit a first pattern of light to a first sub-area of the predetermined area;
   a second light source positioned below the first light source and configured to emit a second pattern of light to a second sub-area of the predetermined area that is above the first sub-area; and
   a controller configured to:
      activate the first light source to determine whether an obstacle is present in the predetermined area, and
      selectively activate the second light source to determine a height of the obstacle based on determining that the obstacle is present in the predetermined area.

14. The mobile robot cleaner according to claim 13, wherein the controller is further configured to:
   determine whether the obstacle is present in the predetermined area based on a location of a first optical pattern associated with the first pattern of light in an image captured by the image sensor, and
   determine the height of the obstacle based on a location of a second optical pattern associated with the second pattern of light in another image captured by the image sensor.

15. The mobile robot according to claim 13, wherein the image sensor, the first light source, and the second light source are mounted to a frame on a front portion of the robot.

16. The mobile robot according to claim 13, wherein the image sensor is positioned lower than the first light source and the second light source.

17. The mobile robot according to claim 13, wherein the image sensor is positioned between the first light source and the second light source.

18. The mobile robot according to claim 17, wherein the first light source and the second light source are be positioned at an equal distance from the image sensor.

\* \* \* \* \*